(12) United States Patent
Duan et al.

(10) Patent No.: US 12,416,706 B2
(45) Date of Patent: Sep. 16, 2025

(54) REFERENCE SIGNAL AGGREGATION FOR RADIO FREQUENCY SENSING

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 18/061,877

(22) Filed: Dec. 5, 2022

(65) Prior Publication Data

US 2024/0183934 A1 Jun. 6, 2024

(51) Int. Cl.
*G01S 7/00* (2006.01)
*G01S 13/00* (2006.01)
*G01S 13/86* (2006.01)
*H04L 5/00* (2006.01)

(52) U.S. Cl.
CPC ............ *G01S 7/006* (2013.01); *G01S 13/003* (2013.01); *G01S 13/86* (2013.01); *H04L 5/0048* (2013.01)

(58) Field of Classification Search
CPC ........ G01S 7/006; G01S 13/003; G01S 13/86; G01S 7/0236; G01S 2013/462; G01S 2013/466; G01S 2013/468; G01S 13/46; G01S 13/878; H04L 5/0048
See application file for complete search history.

(56) References Cited

U.S. PATENT DOCUMENTS

| 2022/0026551 | A1 | 1/2022 | Park et al. |
| 2022/0095319 | A1 | 3/2022 | Duan et al. |
| 2022/0256519 | A1* | 8/2022 | Jeon ................. H04W 72/0453 |
| 2023/0086144 | A1* | 3/2023 | Roy ....................... H04L 5/005 |

OTHER PUBLICATIONS

International Search Report and Written Opinion—PCT/US2023/035406—ISA/EPO—Jan. 25, 2024.

* cited by examiner

*Primary Examiner* — Vladimir Magloire
*Assistant Examiner* — Naomi M Wolford
(74) *Attorney, Agent, or Firm* — Procopio, Cory, Hargreaves & Savitch LLP

(57) ABSTRACT

A first wireless node may output a configuration of a plurality of reference signals (RSs) based on a set of sensing measurement conditions. The sensing measurement conditions may include one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing. A second wireless node may obtain the configuration of the plurality of RSs. The first wireless node may transmit the plurality of RSs for the radar sensing based on the configuration. The second wireless node may receive the plurality of RSs for the radar sensing based on the configuration. The second wireless node may perform the radar sensing based on the received plurality of RSs.

30 Claims, 14 Drawing Sheets

REFERENCE SIGNAL AGGREGATION FOR RADIO FREQUENCY SENSING

TECHNICAL FIELD

The present disclosure relates generally to communication systems, and more particularly, to a wireless sensing system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless node. The wireless node may include a sensing node, such as a user equipment (UE) or a network node. The apparatus may obtain a configuration of a plurality of reference signals (RSs) based on a set of sensing measurement conditions. The set of sensing measurement conditions may include one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing. The apparatus may receive the plurality of RSs for the radar sensing based on the configuration. The apparatus may perform the radar sensing based on the received plurality of RSs.

In an aspect of the disclosure, a method, a computer-readable medium, and an apparatus are provided. The apparatus may include a wireless node. The wireless node may include an RS transmission node, such as a network node. The apparatus may output a configuration of a plurality of RSs based on a set of sensing measurement conditions. The set of sensing measurement conditions may include one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing. The apparatus may transmit the plurality of RSs for the radar sensing based on the configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
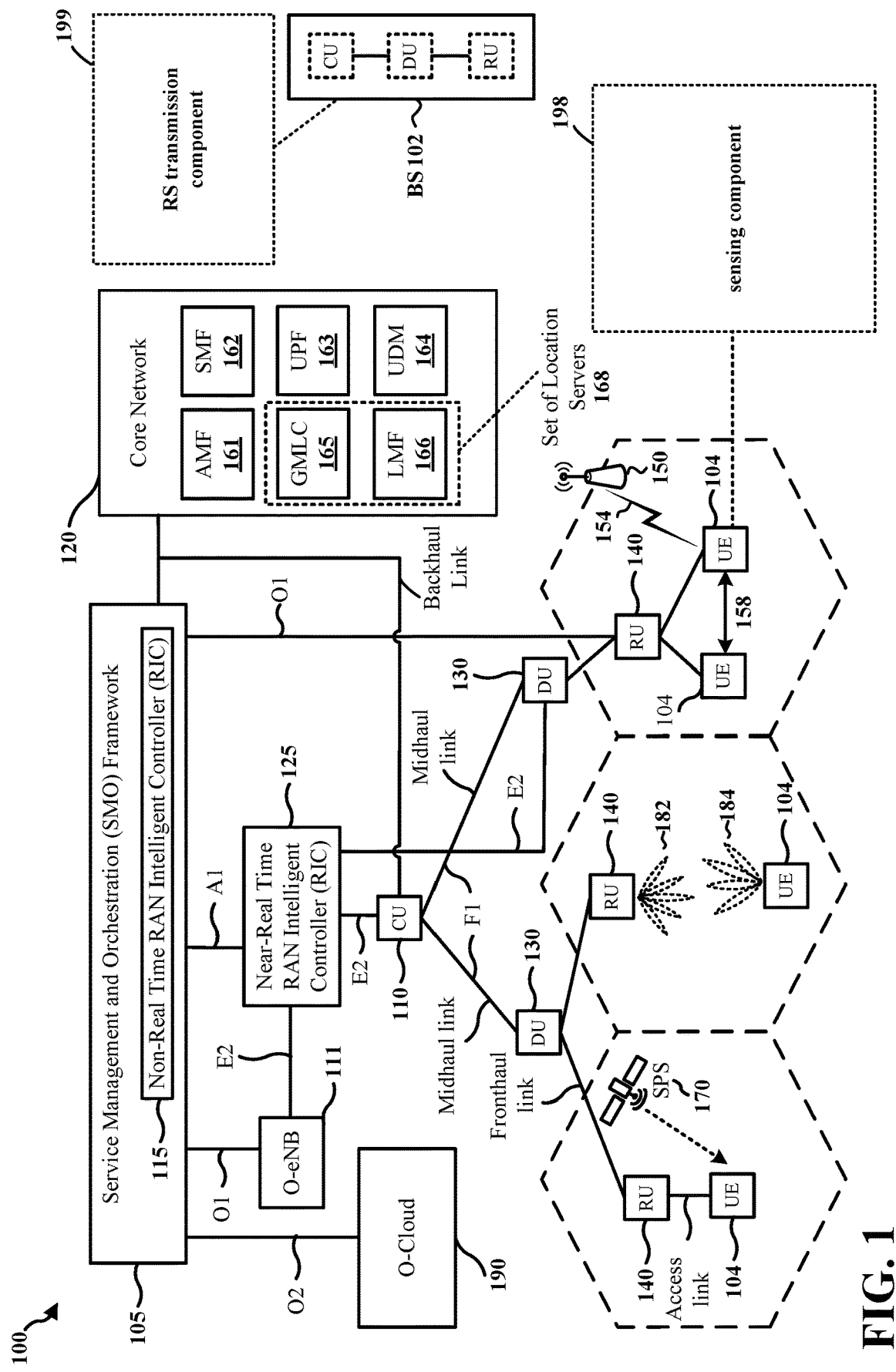
FIG. 1 is a diagram illustrating an example of a wireless communications system and an access network.

Wireless nodes may be configured to sense parameters of a target object (e.g., the target object's location or velocity) by transmitting a signal such that the signal reflects off of the target object, and then by measuring the reflected signal that reflects off of the target object. Such sensing may be referred to as monostatic sensing where a wireless node transmits the signal and the same wireless node measures the reflected signal. Such sensing may be referred to as bistatic sensing where a first wireless node transmits the signal and a second wireless node measures the reflected signal. Such sensing may be referred to as multi-static sensing where a set of wireless nodes may transmit a set of signals and a set of wireless nodes may measure the reflected set of signals.

Implementing a new, dedicated sensing signal to a wireless system, where the dedicated sensing signal may be used for sensing parameters of a target object, may introduce overhead to the wireless system. For example, the wireless system may use more bits to differentiate the dedicated sensing signal from other signals already used by the wireless system, or the sensing signal may interfere with other signals already used by the wireless system. It may be more efficient to use existing reference signals (RSs) used by the wireless system for performing sensing, particularly for bistatic or multi-static sensing with a plurality of wireless nodes. For example, a wireless node may use position reference signals (PRSs), tracking reference signals (TRSs), channel state information (CSI) reference signals (RS) (CSI-RSs), sounding reference signals (SRSs), or synchronization signal blocks (SSBs) for sensing. An SSB may include a primary synchronization signal (PSS) and a secondary synchronization signal (SSS). As used herein, an RS may include any radio frequency (RF) RS that is not a dedicated sensing signal, for example a PRSs, TRSs, CSI-RSs, SRSs, or SSBs. Utilizing an existing RS minimizes the introduction of overhead, as additional bits are not used to implement a new, dedicated signal. Moreover, an existing RS may be used to both perform sensing and perform additional tasks. For example, an SSB may be used to perform sensing and also to enable UEs to detect PCIs of neighboring cells, and a PRS may be used to perform sensing and also to enable UEs to perform positioning relative to a TRP or another UE.

Depending upon the type of sensing measurement, some RSs may result in a better sensing measurement performance than other RSs. For example, a set of PRSs that do not have phase continuity may not be useful for performing velocity estimation on a target object, but a set of PRSs that have phase continuity may be useful for performing velocity estimation on a target object. A set of sensing measurement conditions may be used to determine which RSs may be the best to use for a sensing measurement. A sensing measurement condition may be a restriction or a requirement for a sensing measurement to accurately sense, or measure, a parameter of a target object. A first wireless node may output a configuration of a plurality of RSs based on a set of sensing measurement conditions. The sensing measurement conditions may include one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing. A second wireless node may obtain the configuration of the plurality of RSs. The first wireless node may transmit the plurality of RSs for the radar sensing based on the configuration. The second wireless node may receive the plurality of RSs for the radar sensing based on the configuration. The second wireless node may perform the radar sensing based on the received plurality of RSs. The first wireless node may be an RS transmission node and the second wireless node may be a sensing node performing bistatic sensing. The first wireless node and the second wireless node may be the same wireless node performing monostatic sensing.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a sensing component 198 that may be configured to receive a configuration of a plurality of reference signals (RSs) based on a set of sensing measurement conditions. The set of sensing measurement conditions may include one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing. The sensing component 198 may be configured to receive the plurality of RSs for the radar sensing based on the configuration. The sensing component 198 may be configured to perform the radar sensing based on the received plurality of RSs. In certain aspects, the base station 102 may have an RS transmission component 199 that may be configured to transmit a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. The RS transmission component 199 may be configured to transmit the plurality of RSs for the radar sensing based on the configuration. Although the following description may be focused on 5G NR, the concepts described herein may be applicable to other similar areas, such as LTE, LTE-A, CDMA, GSM, and other wireless radio frequency (RF) technologies.

Figure 2:
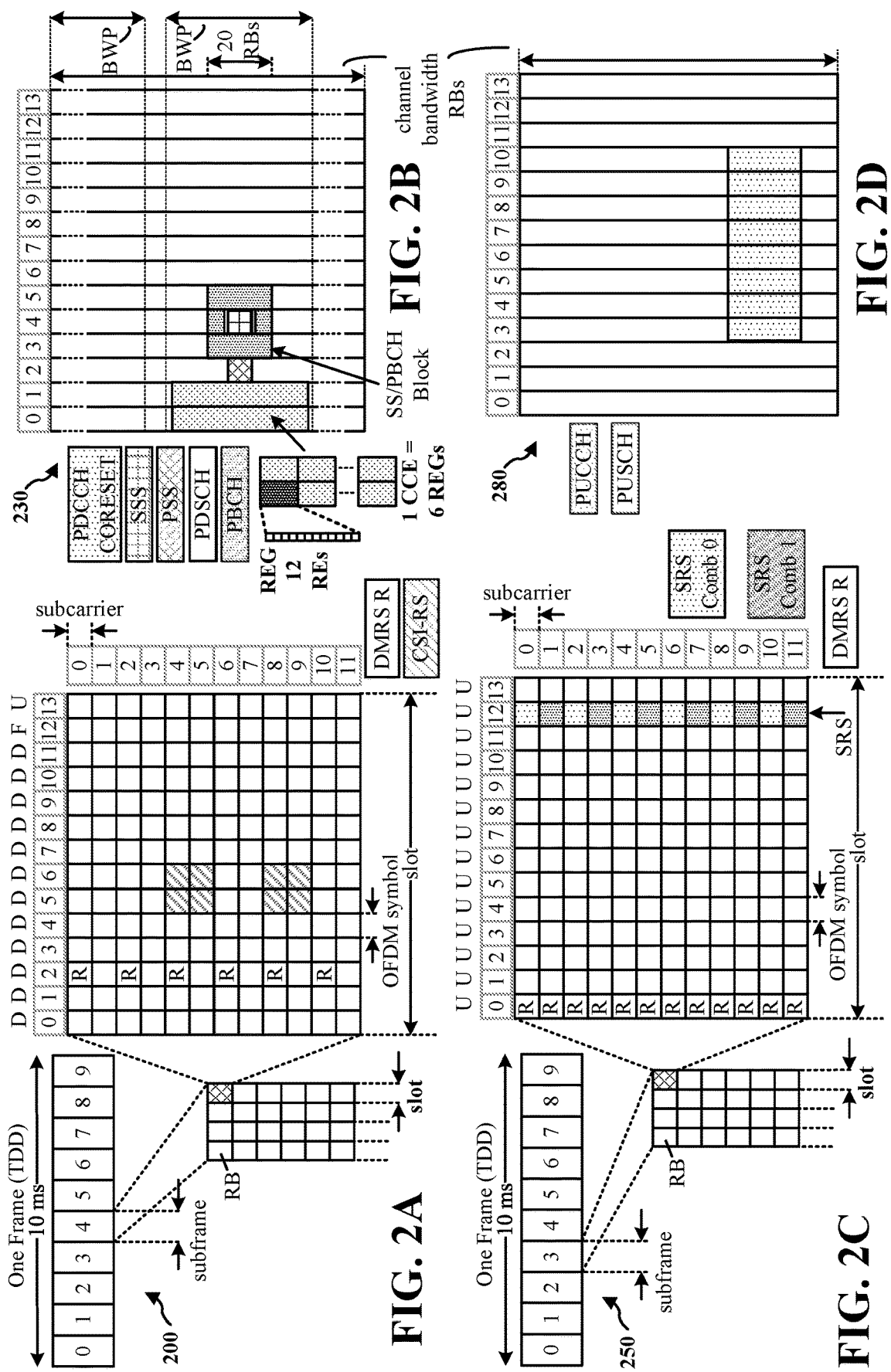
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
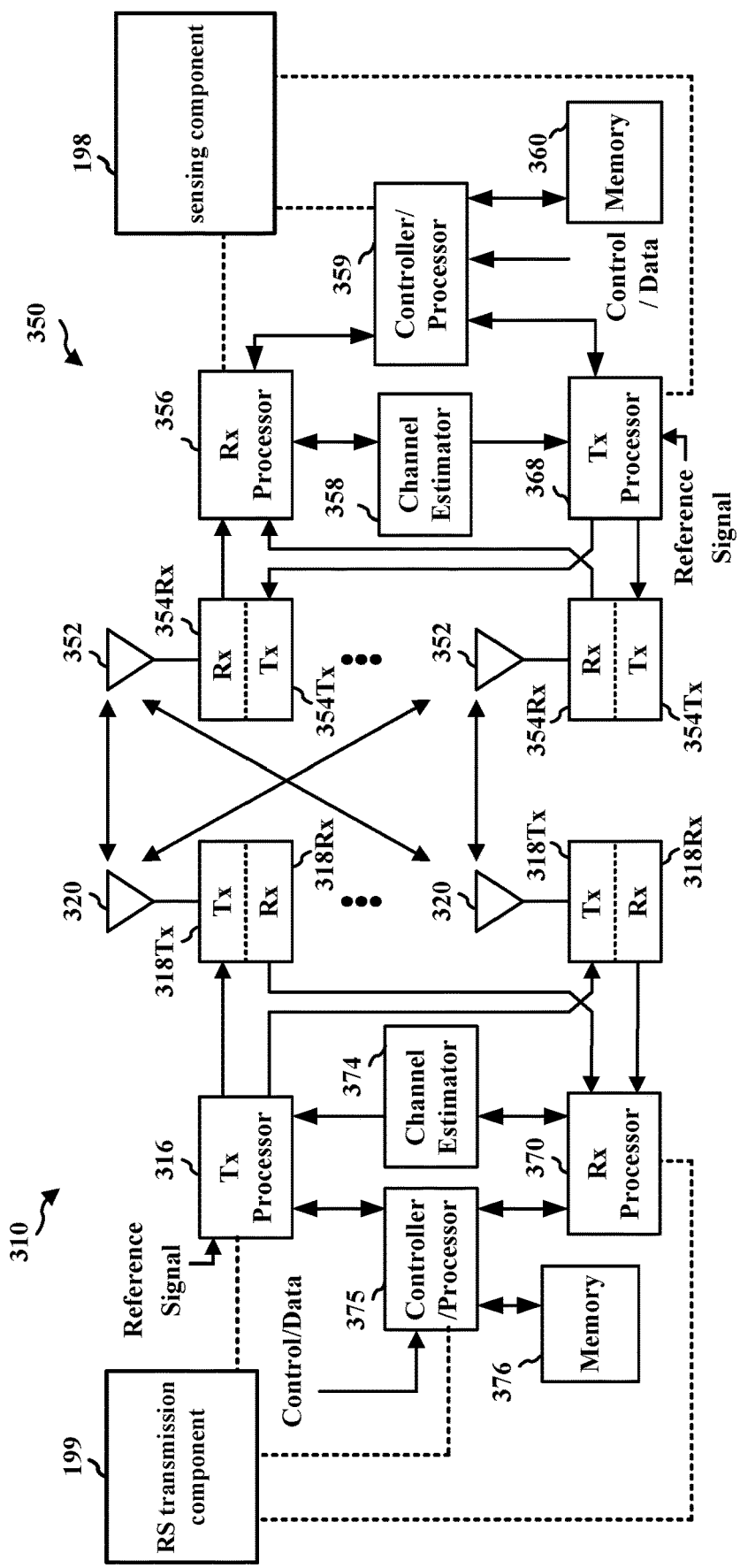
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the sensing component 198 of FIG. 1.

At least one of the Tx processor 316, the Rx processor 370, and the controller/processor 375 may be configured to perform aspects in connection with the RS transmission component 199 of FIG. 1.

Figure 4:
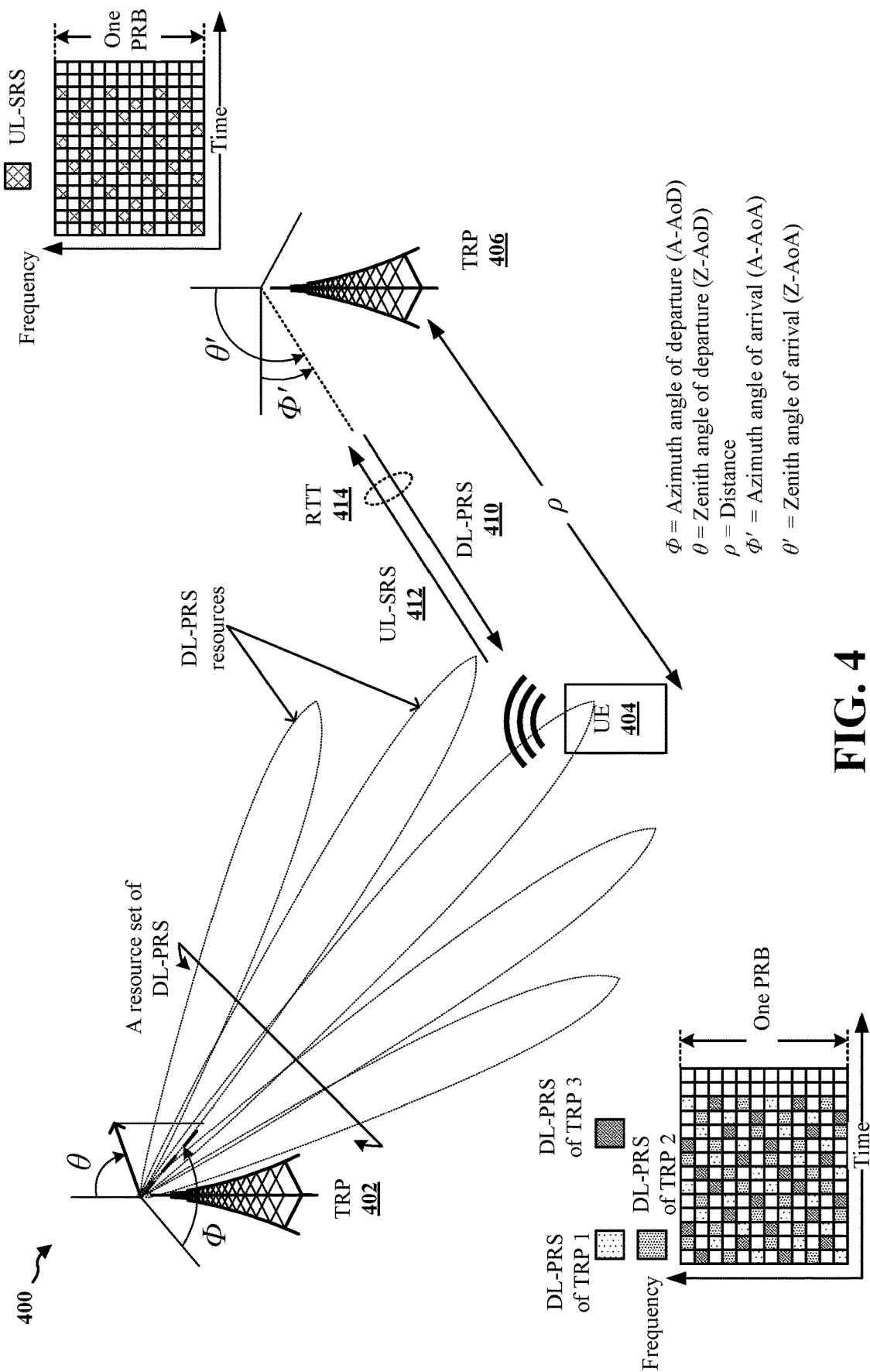
FIG. 4 is a diagram illustrating an example of a positioning based on reference signal (RS) measurements.

FIG. 4 is a diagram 400 illustrating an example of positioning based on RS measurements. The UE 404 may transmit UL-SRS 412 at time $T_{SRS\_Tx}$ and receive DL positioning reference signals (PRS) (DL-PRS) 410 at time $T_{PRS\_Rx}$. The TRP 406 may receive the UL-SRS 412 at time $T_{SRS\_Rx}$ and transmit the DL-PRS 410 at time $T_{PRS\_Tx}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $|T_{SRS\_Rx}-T_{PRS\_Tx}|-|T_{SRS\_Tx}-T_{PRS\_Rx}|$. Accordingly, multi-RTT positioning may make use of the UE Rx-Tx time difference measurements (i.e., $|T_{SRS\_Tx}-T_{PRS\_Rx}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_Rx}-T_{PRS\_Tx}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402,406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402,406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
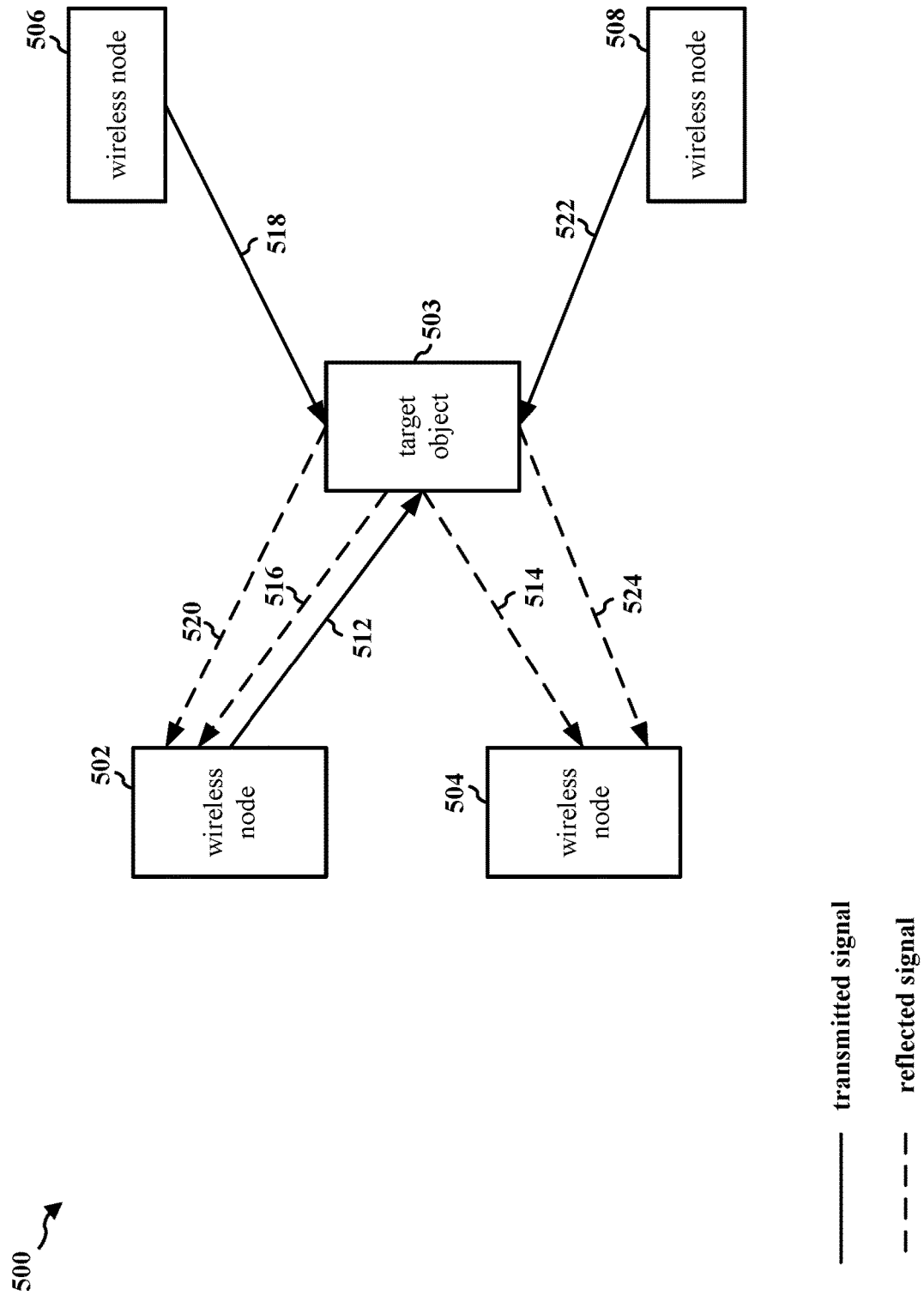
FIG. 5 is a diagram illustrating an example of sensing based on RS measurements.

FIG. 5 is a diagram 500 illustrating an example of sensing based on RS measurements. In one aspect, the wireless node 502 may perform monostatic sensing, where the wireless node 502 may transmit a set of RSs 512 at the target object 503, the target object 503 may reflect the set of RSs 512 as the reflected set of RSs 516 at the wireless node 502, and the wireless node 502 may measure the reflected set of RSs 516 from the target object 503. In another aspect, the wireless node 502 and the wireless node 504 may perform bistatic sensing, where the wireless node 502 may transmit a set of RSs 512 at the target object 503, the target object 503 may reflect the set of RSs 512 as the reflected set of RSs 514 at the wireless node 504, and the wireless node 504 may measure the reflected set of RSs 514 from the target object 503. In another aspect the wireless node 502 and the wireless node 506 may perform multi-static sensing, where in addition to the wireless node 502 measuring the reflected set of RSs 516 from the target object 503 using monostatic sensing, the wireless node 506 may transmit a set of RSs 518 at the target object 503, the target object 503 may reflect the set of RSs 518 as the reflected set of RSs 520 at the wireless node 502, and the wireless node 502 may measure the reflected set of RSs 520 from the target object 503. In another aspect the wireless node 502, the wireless node 504, and the wireless node 508 may perform multi-static sensing, where in addition to the wireless node 504 measuring the reflected set of RSs 514 from the target object 503 using bistatic sensing, the wireless node 508 may transmit a set of RSs 522 at the target object 503, the target object 503 may reflect the set of RSs 522 as the reflected set of RSs 524 at the wireless node 504, and the wireless node 504 may measure the reflected set of RSs 524 from the target object 503. Each wireless node may be any wireless device configured to transmit or receive wireless signals, such as UEs, network nodes, TRPs, or base stations. For example, the wireless node 502 may be a network node configured to transmit the set of RSs 512 at the target object 503 and measure the reflected set of RSs 516 from the target object 503. In another example, the wireless node 502 may be a network node configured to transmit the set of RSs 512 at the target object 503, and the wireless node 504 may be a UE configured to measure the reflected set of RSs 514 from the target object 503.

The wireless node 502 may conduct one or more sensing measurements on the reflected set of RSs 516 and/or the reflected set of RSs 520. In one aspect, the wireless node 502 may calculate a distance or a range between the wireless node 502 and the target object 503 based on a round trip time (RTT) between when the wireless node 502 transmits the set of RSs 512 and when the wireless node 502 receives the reflected set of RSs 516. In one aspect, the wireless node 502 may calculate a distance or a range that the set of RSs 518 and the reflected set of RSs 520 travels based on a time between when the wireless node 506 transmits the set of RSs 518 and when the wireless node 502 receives the reflected set of RSs 520. In one aspect, the wireless node 502 may calculate a location of the target object 503 based on a plurality or range or distance measurements, for example via triangulation using known positions of the wireless nodes 502 and 506 and the calculated range or distance measurements. In one aspect, the wireless node 502 may calculate a velocity of the target object 503 based on a first calculated location of the target object 503 based on the reflected set of RSs 516 and/or the reflected set of RSs 520 measured at a first time, and a second calculated location of the target object 503 based on the reflected set of RSs 516 and/or the reflected set of RSs 520 measured at a second time. In one aspect, the wireless node 502 may calculate an AoA of the reflected set of RSs 516 and/or an AoD of the set of RSs 512 based on a plurality of ports that transmitted the set of RSs 512 and a plurality of ports that received the reflected set of RSs 516. In one aspect, the wireless node 502 may calculate an AoA of the reflected set of RSs 520 and/or an AoD of the set of RSs 518 based on a plurality of ports that transmitted the set of RSs 518 and a plurality of ports that received the reflected set of RSs 520.

Similarly, the wireless node 504 may conduct one or more sensing measurements on the reflected set of RSs 514 and/or the reflected set of RSs 524. In one aspect, the wireless node 504 may calculate a distance or a range that the set of RSs 512 and the reflected set of RSs 514 travels based on a on a time between when the wireless node 502 transmits the set of RSs 512 and when the wireless node 504 receives the reflected set of RSs 514. In one aspect, the wireless node 504 may calculate a distance or a range that the set of RSs 522 and the reflected set of RSs 524 travels based on a time between when the wireless node 508 transmits the set of RSs 522 and when the wireless node 504 receives the reflected set of RSs 524. In one aspect, the wireless node 504 may calculate a location of the target object 503 based on a plurality or range or distance measurements, for example via triangulation using the known positions of wireless nodes 502, 504, and 508, and the calculated range or distance measurements. In one aspect, the wireless node 504 may calculate a velocity of the target object 503 based on a first calculated location of the target object 503 based on the reflected set of RSs 514 and/or the reflected set of RSs 524 measured at a first time, and a second calculated location of the target object 503 based on the reflected set of RSs 514 and/or the reflected set of RSs 524 measured at a second time. In one aspect, the wireless node 504 may calculate an AoA of the reflected set of RSs 514 and/or an AoD of the set of RSs 512 based on a plurality of ports that transmitted the set of RSs 512 and a plurality of ports that received the reflected set of RSs 514. In one aspect, the wireless node 504 may calculate an AoA of the reflected set of RSs 524 and/or an AoD of the set of RSs 522 based on a plurality of ports that transmitted the set of RSs 522 and a plurality of ports that received the reflected set of RSs 524.

A sensing measurement or a sensing measurement report may be associated with a set of measurement conditions. A sensing measurement condition may be described as a range resolution $\Delta d$, which defines a requisite range resolution for a sensing measurement. The range resolution $\Delta d$ may be expressed as a smallest possible change in a calculated distance based on the measured signal, such as 20 meters (m) or 0.3 m. A sensing measurement having a range resolution with a value that is less than or equal to the sensing measurement condition range resolution $\Delta d$ may be described as satisfying the sensing measurement condition, or having a high range resolution. A sensing measurement having a range resolution with a value that is greater than or equal to the sensing measurement condition range resolution $\Delta d$ may be described as not satisfying the sensing measurement condition, or having a high range resolution that is too low.

A sensing measurement condition may be a maximum range $d_{max}$, which defines a requisite maximum range for a sensing measurement. The maximum range $d_{max}$ may be expressed as a largest possible calculated distance based on the measured signal, such as 3000 m or 100 m. A sensing measurement having a maximum range with a value that is greater than or equal to the sensing measurement maximum range $d_{max}$ may be described as satisfying the sensing measurement condition, or having a high maximum range. A sensing measurement having a maximum range with a value that is less than or equal to the sensing measurement condition maximum range $d_{max}$ may be described as not satisfying the sensing measurement condition, or having a maximum range that is too low.

A sensing measurement condition may be a velocity resolution $\Delta v$, which defines a requisite velocity for a sensing measurement. The velocity resolution $\Delta v$ may be expressed as a smallest possible change in a calculated velocity based on the measured signal, such as 300 kilometers per hour (km/h) or 10 km/h. A sensing measurement having a velocity resolution with a value that is less than or equal to the sensing measurement velocity resolution $\Delta v$ may be described as satisfying the sensing measurement condition, or having a high velocity resolution. A sensing measurement having a velocity resolution with a value that is greater than or equal to the sensing measurement condition velocity resolution $\Delta v$ may be described as not satisfying the sensing measurement condition, or having a velocity resolution that is too low.

A sensing measurement condition may be a maximum velocity $v_{max}$, which defines a requisite maximum velocity for a sensing measurement. The maximum velocity $v_{max}$ may be expressed as a largest possible calculated velocity based on the measured signal, such as 3000 km or 50 km/h. A sensing measurement having a maximum velocity with a value that is greater than or equal to the sensing measurement maximum velocity $v_{max}$ may be described as satisfying the sensing measurement condition, or having a high maximum velocity. A sensing measurement having a maximum velocity with a value that is less than or equal to the sensing measurement condition maximum velocity $v_{max}$ may be described as not satisfying the sensing measurement condition, or having a maximum velocity that is too low. An effective velocity range $v_{eff}$ may be defined as $v_{eff}=2v_{max}$. A sensing measurement having an effective velocity range with a value that is greater than or equal to the sensing measurement effective velocity range $v_{eff}$ may be described as satisfying the sensing measurement condition, or having a high effective velocity range. A sensing measurement having an effective velocity range with a value that is less than or equal to the sensing measurement condition effective velocity range $v_{eff}$ may be described as not satisfying the sensing measurement condition, or having an effective velocity range that is too low.

A sensing measurement condition may be a condition to measure an AoA of a signal, which may be measured using some RSs (e.g., SSB, CSI-RS), but not other RSs (e.g., TRS). A sensing measurement condition may be a condition to measure an AoD of a signal, which may be measured using some RSs (e.g., SSB, CSI-RS), but not other RSs (e.g., TRS). A resolution of a measured AoA or a measured AoD may be improved by supporting MIMO sensing. A sensing measurement condition may be a defined MIMO sensing occasion for performing MIMO sensing, which may be possible with some RSs (e.g., RSs transmitted using a plurality of ports), but not other RSS (e.g., RSs transmitted using one port). MIMO sensing occasions may be supported by a wireless node configured to transmit an RS using a plurality of ports.

In some aspects, a parameter of an RS may be used to calculate a sensing measurement parameter. In other words, the parameter of the RS may be used to determine if a sensing measurement condition may be satisfied by the RS. There may be a defined relationship between a set of parameters of an RS and a set of sensing measurement parameters. Table 2 below illustrates an example of defined relationships, or equations, between RS parameters and sensing measurement parameters.

TABLE 2

Relationships between RS parameters and sensing parameters

| RS parameter | Equation | |
|---|---|---|
| Subcarrier spacing ($\Delta f$) | $\Delta f > 4v_{max}f_c/c$ | $v_{max} < c\Delta f/(4f_c)$ |
| OFDM symbol length ($T_u$) | $T_u/2 > 2d_{max}/c$ | $d_{max} < cT_u/4$ |
| Bandwidth (W) | $W > c/(2\Delta d)$ | $\Delta d > c/(2W)$ |
| Burst duration ($T_B$) | $T_B > c/(2f_c\Delta v)$ | $\Delta v > c/(2f_cT_B)$ |
| Time domain spacing ($T_S$) | $T_S < c/(2f_cv_{eff})$ | $v_{eff} < c/(2f_cT_S)$ |
| Freq. domain spacing ($f_S$) | $f_S < c/(2d_{max})$ | $d_{max} < c/(2f_S)$ |

The subcarrier spacing $\Delta f$ may be used to determine the boundaries of a maximum Doppler frequency associated with the RS. For example, a maximum Doppler frequency of a RS may be bounded by half the SCS, or $\Delta f/2$. The subcarrier spacing $\Delta f$ of an RS may be described in terms of kilohertz (kHz). The orthogonal frequency-division multiplexing (ODFM) symbol length Ty may be used to determine the boundaries of a time until the latest echo associated with the RS. The ODFM symbol length may be described in terms of milliseconds (ms). For example, a time until the latest echo of an RS may be bounded by half the ODFM symbol length, or $T_u/2$. The bandwidth W of an RS may be described in terms of megahertz (MHz). The burst duration $T_B$ of an RS may be used to describe a time span over which the RS may extend. The burst duration $T_B$ may be described in terms of ms. The time domain spacing $T_S$ may describe the spacing between consecutive RSs in a time domain. The time domain spacing may be described in terms of ms. The frequency domain spacing $f_S$ may describe the spacing between consecutive RSs in a frequency domain. The frequency domain spacing may be described in terms of ms.

A wireless node may configure a PRS, or a DL-PRS, as a sensing signal. The wireless node may configure the PRS to have any suitable bandwidth, for example a bandwidth between 24 physical resource blocks (PRBs) and 272 PRBs. A PRS may have multiple positioning layers with different bandwidths used for different sensing purposes. In one aspect, a first positioning frequency layer may have a wide bandwidth and a short duration for range estimation and a second positioning frequency layer may have a narrow bandwidth and a long duration, with respect to the first positioning frequency layer) for velocity estimation. The wireless node may configure the PRS to have a fully frequency-domain staggered pattern. The wireless node may configure the PRS to repeat resources N times (e.g., N=1, 2, 4, 6, 8, 16, 32) for a single instance of the PRS resource set.

The wireless node may configure the PRS to have a gap of G symbols between PRS repetitions (e.g., G=1, 2, 4, 6, 8, 16, 32). For example, a PRS resource may span up to 32×32 slots, with a burst duration $T_B$ of 16 ms, a resource repeated every 32 blocks, a time gap of 4 slots, and a subcarrier spacing $\Delta f$ of 120 kHz.

In one aspect, a configured PRS may have a center frequency $f_c$ of 3.5 GHZ, a subcarrier spacing $\Delta f$ of 30 kHz, a bandwidth W of 100 MHz, and a burst duration $T_B$ of 16 ms. In another aspect, a configured PRS may have a center frequency $f_c$ of 13 GHz, a subcarrier spacing $\Delta f$ of 120 kHz, a bandwidth W of 400 MHZ, and a burst duration $T_B$ of 16 ms. A wireless node may calculate a set of sensing measurement parameters for the configured PRSs as shown in Table 3 below.

TABLE 3 sensing parameters of exemplary PRSs

| | $f_c$ = 3.5 GHz, $\Delta f$ = 30 kHz, W = 100 MHz, $T_B$ = 16 ms | $f_c$ = 13 GHz, $\Delta f$ = 120 kHz, W = 400 MHz, $T_B$ = 16 ms |
|---|---|---|
| $\Delta d > c/(2W)$ | 1.5 m | 0.38 m |
| $\Delta v > c/(2f_c T_B)$ | 9.6 km/h | 2.6 km/h |
| $d_{max} < cT_u/4$ | 2676 m | 668.9 m |
| $v_{max} < c\Delta f/(4f_c)$ | 2314 km/h | 2492 km/h |

In some aspects, a wireless node may enhance a PRS to improve its performance. In one aspect, a plurality of PRSs may be configured to have phase continuity between the multiple PRS transmissions to support velocity estimation. In other words, a wireless node that receives a plurality of reflected PRSs may calculate a velocity of a target object. In another aspect, a set of PRSs may be configured to be transmitted using multiple ports to support MIMO sensing and improve AoA and/or AoD estimation. In other words, a wireless node that receives a plurality of reflected PRSs may calculate an AoA of the plurality of reflected PRSs or an AoD of the plurality of transmitted PRSs. In some aspects, a wireless node may be configured to ensure phase continuity between a plurality of PRS transmissions to improve a velocity resolution for a sensing measurement of a target object.

A wireless node may configure an SSB as a sensing signal. Each SSB may have a PSS and an SSS. The wireless node may configure the SSB to have any suitable configuration, for example 20 RBs in 4 consecutive OFDM symbols. In one aspect, a configured SSB may have a center frequency $f_c$ of 3.5 GHz and a subcarrier spacing $\Delta f$ of 30 kHz. In another aspect, a configured SSB may have a center frequency $f_c$ of 13 GHz and a subcarrier spacing $\Delta f$ of 120 kHz. A wireless node may calculate a set of sensing measurement parameters for the configured SSBs as shown in Table 4 below.

TABLE 3 sensing parameters of exemplary SSBs

| | $f_c$ = 3.5 GHz, $\Delta f$ = 30 kHz | $f_c$ = 13 GHz, $\Delta f$ = 120 kHz |
|---|---|---|
| $\Delta d > c/(2W)$ | 20.8 m | 5.2 m |
| $\Delta v > c/(2f_c T_B)$ | 1081 km/h | 1164 km/h |
| $d_{max} < cT_u/4$ | 2676 m | 668.9 m |
| $v_{max} < c\Delta f/(4f_c)$ | 2314 km/h | 2492 km/h |

As shown, the range resolution of a configured SSB having a center frequency $f_c$ of 13 GHz and a subcarrier spacing $\Delta f$ of 120 kHz may have a range resolution $\Delta d$ greater than 5 m and a velocity resolution $\Delta v$ greater than 1000 km/h. Since the range and the velocity resolution is low, a wireless node may be configured to use an SSB as a sensing signal to perform object detection to calculate a rough position and velocity before using other RSs to perform more accurate range or velocity calculations or estimations.

A wireless node may configure a TRS as a sensing signal. The wireless node may configure the TRS to have a density rho=3. Such a TRS may have a range estimation capability similar to a PRS. The wireless node may configure the TRS to have a staggered structure, as a comb-4 structure without staggering may cause an aliasing problem for range estimation. In other words, the low density of a TRS in a frequency domain may cause an aliasing problem for range estimation. The wireless node may configure the TRS to have up to two-slot TRS patterns with a separation of four symbols. In one aspect, a configured TRS may have a center frequency $f_c$ of 3.5 GHZ, a subcarrier spacing $\Delta f$ of 30 kHz, and a bandwidth W of 100 MHz. In another aspect, a configured SSB may have a center frequency $f_c$ of 13 GHZ, a subcarrier spacing $\Delta f$ of 120 kHz, and a bandwidth W of 400 MHZ. The value of $f_S$ may be equal to a multiple of $\Delta f$, such as 2 or 4. A wireless node may calculate a set of sensing measurement parameters for the configured TRSs as shown in Table 5 below.

TABLE 5 sensing parameters of exemplary TRSs

| | $f_c$ = 3.5 GHz $\Delta f$ = 30 kHz, W = 100 MHz | $f_c$ = 13 GHz $\Delta f$ = 120 kHz, W = 400 MHz |
|---|---|---|
| $\Delta d > c/(2W)$ | 1.5 m | 0.38 m |
| $\Delta v > c/(2f_c T_B)$ | 228 km/h | 245 km/h |
| $d_{max} < cT_u/4$ | 2676 m | 668.9 m |
| $v_{max} < c\Delta f/(4f_c)$ | 2314 km/h | 2492 km/h |
| $d_{max} < c/(2f_S)$ | 1250 m | 312.5 m |
| $v_{max} < c/(4f_c T_S)$ | 540.6 km/h | 582.1 km/h |

As shown, the range resolution of either configured TRS may be comparable to a PRS with similar RS parameters, but the velocity resolution of either configured TRS may be low, as the velocity resolution for both is greater than 200 km/h. In some aspects, a wireless node may enhance a TRS to improve its performance. In one aspect, a plurality of TRSs may be configured to have phase continuity between the multiple TRS transmissions to improve the velocity resolution. For example, a wireless node may configure a TRS with more than a two-slot time-span. In another aspect, a set of TRSs may be configured to have an increased phase coherency duration, or a longer TRS repetition, to improve the velocity resolution.

A wireless node may configure a CSI-RS as a sensing signal. The wireless node may configure the CSI-RS to have a sparse resource density (e.g., 1 RE per RB or 0.5 RE per RB). Such a CSI-RS may result in an aliasing problem for range estimation. In other words, the low density of a CSI-RS in a frequency domain may cause an aliasing problem for range estimation. The wireless node may configure the CSI-RS to have a full band CSI-RS in a frequency domain. Such a CSI-RS may provide similar range resolution to a PRS or TRS. The wireless node may configure the CSI-RS to be transmitted using a plurality of antenna ports.

For example, the CSI-RS may be transmitted using 1, 2, 4, 8, 12, 16, 24, or 32 antenna ports. A wireless node may measure a such a reflected CSI-RS using MIMO radar sensing. In one aspect, a configured CSI-RS may have a shortest period of 4 slots. A wireless node may not support resource repetition within a period.

In one aspect, a configured CSI-RS may have a center frequency $f_c$ of 3.5 GHZ, a subcarrier spacing $\Delta f$ of 30 kHz, a bandwidth W of 100 MHz, and a burst duration $T_B$ of 16 ms. In another aspect, a configured CSI-RS may have a center frequency $f_c$ of 13 GHz, a subcarrier spacing $\Delta f$ of 120 kHz, a bandwidth W of 400 MHZ, and a burst duration $T_B$ of 16 ms. A wireless node may calculate a set of sensing measurement parameters for the configured CSI-RSs as shown in Table 6 below.

TABLE 6 sensing parameters of exemplary CSI-RSs

| | $f_c$ = 3.5 GHz, $\Delta f$ = 30 kHz, W = 100 MHz, $T_B$ = 16 ms | $f_c$ = 13 GHz, $\Delta f$ = 120 kHz W = 400 MHz, $T_B$ = 16 ms |
|---|---|---|
| $\Delta d > c/(2W)$ | 1.5 m | 0.38 m |
| $\Delta v > c/(2f_c T_B)$ | 9.6 km/h | 2.6 km/h |
| $d_{max} < cT_u/4$ | 2676 m | 668.9 m |
| $v_{max} < c\Delta f/(4f_c)$ | 2314 km/h | 2492 km/h |
| $d_{max} < c/(2f_S)$ | 416.7 m | 104.2 m |
| $v_{max} < c/(4f_c T_S)$ | 38.6 km/h | 41.6 km/h |

As shown, the range resolution of either CSI-RS may be comparable to a PRS or a TRS with similar RS parameters-particularly an enhanced TRS with an increased phase coherency duration. In some aspects, a wireless node may enhance a CSI-RS to improve its performance. In one aspect, a plurality of CSI-RSs may be configured to have phase continuity between the multiple CSI-RS transmissions to improve the velocity resolution. In other words, a wireless node may be configured to ensure phase coherency during at least one CSI-RS period. A wireless node may also be configured to increase a time-span of the CSI-RS to improve velocity resolution.

Figure 6:
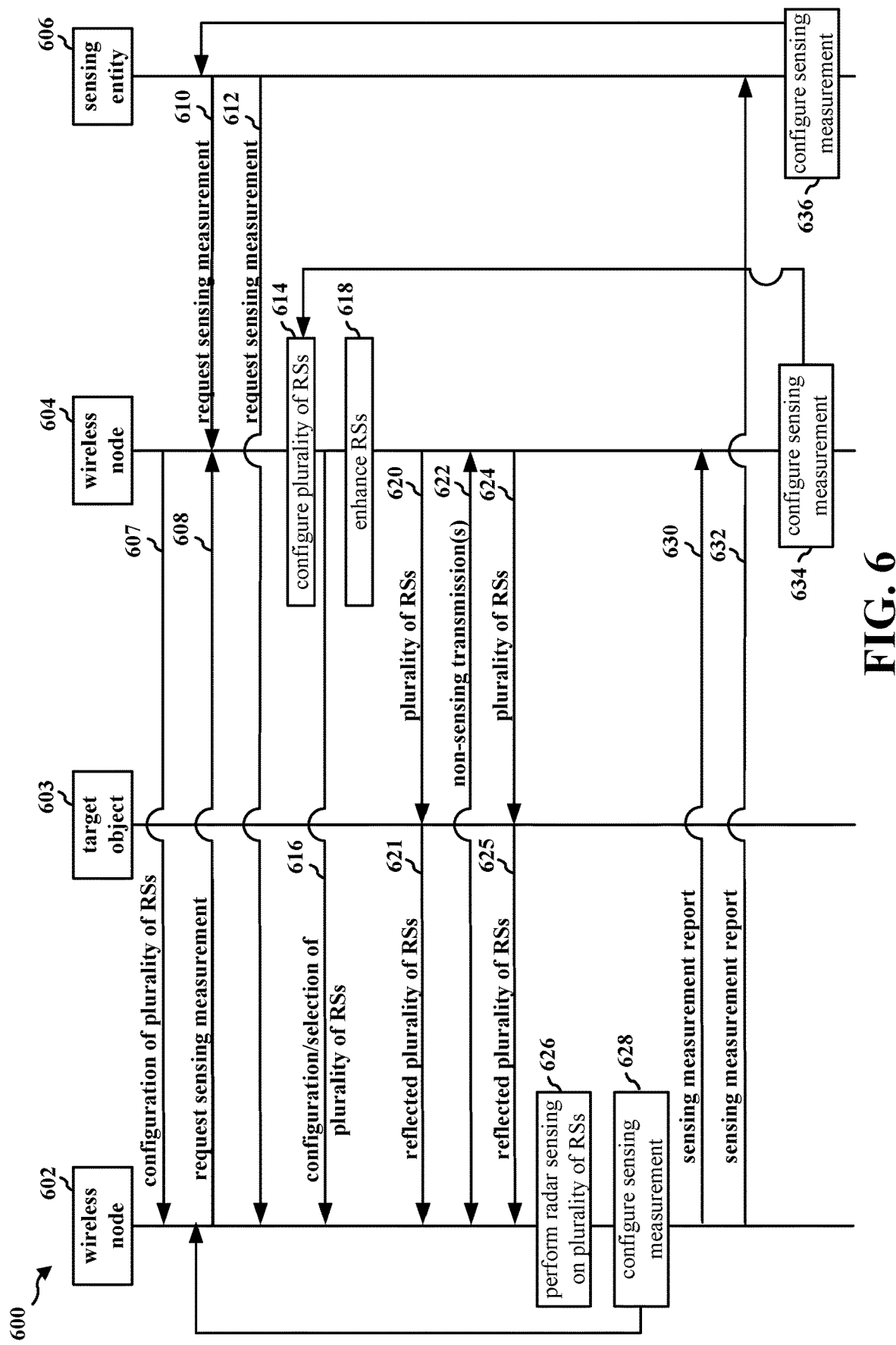
FIG. 6 is a connection flow diagram illustrating an example of bistatic sensing.

FIG. 6 is a connection flow diagram 600 illustrating a wireless node 602 and a wireless node 604 configured to perform bistatic sensing on a target object 603. The wireless node 604 may transmit the plurality of RSs 620 to the target object 603. The target object 603 may reflect the plurality of RSs 620 as the reflected plurality of RSs 621 to the wireless node 602. At 626, the wireless node 602 may perform radar sensing on the reflected plurality of RSs 621 to calculate one or more parameters of the target object 603 relative to the wireless node 602. In one aspect, the wireless node 602 may estimate a range of the target object 603 from the wireless node 602 based on a time difference between transmission of the plurality of RSs 620 from the wireless node 604 and reception of the reflected plurality of RSs 621 at the wireless node 602. In one aspect, the wireless node 602 may estimate a velocity of the target object 603 by estimating the range of the target object from the wireless node 602 at one time, and then by estimating the range of the target object from the wireless node 602 at another time.

While a wireless node may define and configure a dedicated sensing signal for wireless nodes to use to perform sensing in a wireless system, configuring a dedicated sensing signal for wireless entities to use for sensing may introduce overhead. For example, the wireless system may use more bits to differentiate the dedicated sensing signal from other signals already used by the wireless system, or the sensing signal may interfere with other signals already used by the wireless system. Moreover, altering a wireless system to use a new dedicated sensing signal may use time and resources that are better spent maintaining the wireless system. It may be more efficient to use existing RSs for sensing. For example, a wireless node may use PRSs, TRSs, CSI-RSs, SRSs, or SSBs for sensing. In some aspects, it may be more efficient to use an RS to perform sensing, as the RS may be used by the wireless entity to perform additional tasks. For example, an SSB may be used to perform sensing and also to enable UEs to detect PCIs of neighboring cells, and a PRS may be used to perform sensing and also to enable UEs to perform positioning relative to a TRP or another UE.

While an RS may be used for RF sensing, certain RSs may have better performance than other RSs. For example, a set of PRSs that do not have phase continuity may not be useful to perform velocity estimation on a target object, but a set of PRSs that have phase continuity may be useful to perform velocity estimation on a target object. The wireless node 604 may be configured to configure a plurality of RSs for sensing based on a set of sensing measurement conditions for radar sensing. A condition may be a restriction or a requirement for a sensing measurement to satisfy to accurately sense a target object. The wireless node 604 may be configured to transmit a configuration or a selection 616 of a plurality of RSs based on a set of sensing measurement conditions. The wireless node 604 may select and configure the plurality of RSs based on the set of sensing measurement conditions. The sensing measurement conditions may include one or more of a range resolution, a maximum range, a velocity resolution, a maximum velocity, a velocity range, an AoA measurement, an AoD measurement, or a MIMO sensing occasion for radar sensing. The wireless node 602 may receive the configuration or selection 616 of the plurality of RSs based on the set of sensing measurement conditions. The wireless node 604 may transmit the plurality of RSs 620 for the radar sensing based on the configuration or selection 616 of the plurality of RSs. The plurality of RSs 620 may reflect off of the target object 603 as the reflected plurality of RSs 621. The wireless node 602 may receive the reflected plurality of RSs 621 from the target object 603. At 626, the wireless node 602 may perform radar sensing on the reflected plurality of RSs 621 based on the received configuration.

Any suitable wireless entity may request a sensing measurement. In one aspect, the wireless node 602 may transmit a request 608 for a sensing measurement to the wireless node 604, indicating to the wireless node 604 to configure and transmit the plurality of RSs 620. In one aspect, a sensing entity 606 may transmit a request 610 for a sensing measurement to the wireless node 604, indicating to the wireless node 604 to configure and transmit the plurality of RSs 620. In one aspect, the sensing entity 606 may transmit a request 612 for a sensing measurement to the wireless node 602, indicating to the wireless node 602 to receive and measure the reflected plurality of RSs 621. A request for a sensing measurement may include one or more sensing measurement conditions and/or one or more sensing reports. A sensing measurement condition may include, for example, a range resolution, a maximum range, a velocity resolution, a maximum velocity, a velocity range, an AoA measurement, an AoD measurement, or a MIMO sensing occasion for radar sensing. A range resolution may be a requisite range resolution for a measurement, defined as a smallest possible change in a calculated distance based on the measured signal. A maximum range may be a requisite maximum range for a measurement, defined as a largest possible calculated distance based on the measured signal. A velocity resolution may be a requisite velocity for a measurement, defined as a smallest possible change in a calculated velocity based on the measured signal. A maximum velocity may be a requisite maximum velocity for a measurement, defined as a largest possible calculated velocity based on the measured signal. An AoA measurement may be a condition to measure an AoA of a signal, which may be measured using some RSs (e.g., SSB, CSI-RS), but not other RSs (e.g., TRS). An AoD measurement may be a condition to measure an AoD of a signal, which may be measured using some RSs (e.g., SSB, CSI-RS), but not other RSs (e.g., TRS). A MIMO sensing occasion may be a defined occasion for performing MIMO sensing, which may be possible with some RSs (e.g., RSs transmitted using a plurality of ports), but not other RSs (e.g., RSs transmitted using one port).

At 614, the wireless node 604 may configure a plurality of RSs for the requested sensing measurement. The wireless node 604 may be configured to take the set of sensing measurement conditions into consideration by allocating a plurality of RSs to a sensing measurement occasion based on the set of sensing measurement conditions. At 618, the wireless node 604 may enhance one or more of the plurality of RSs based on the set of sensing measurement conditions. For example, the wireless node 604 may enhance the one or more of the plurality of RSs to ensure that the enhanced RS may be used to perform a sensing measurement that satisfies one of the set of sensing measurement conditions.

In one aspect, a sensing measurement condition may be a condition to support a high resolution range measurement. In other words, the sensing measurement condition may be a range resolution that is less than or equal to a requisite range resolution threshold. In response, the wireless node 604 may be configured to configure at least one CSI-RS, at least one PRS, and at least one SRS to the sensing measurement such that each of the at least one CSI-RS, at least one PRS, and at least one SRS are configured to satisfy the sensing measurement condition to support the resolution range measurement.

In one aspect, a sensing measurement condition may be a condition to support a high resolution speed. In other words, the sensing measurement condition may be a velocity resolution that is less than or equal to a requisite velocity resolution threshold. In response, the wireless node 604 may be configured to configure at least two TRSs or at least two PRSs to the sensing measurement based on the sensing measurement condition. At 618, the wireless node 604 may enhance the at least two TRSs or the at least two PRSs based on the sensing measurement condition. For example, the wireless node 604 may enhance the at least two TRSs or the at least two PRSs to ensure that a sensing measurement of the configured RSs satisfies the sensing measurement condition. In one aspect, the wireless node 604 may be configured to enhance the phase coherency duration of the TRSs to meet a condition of a high-resolution speed estimation. In other words, the wireless node 604 may be configured to ensure that the phase coherency duration of the TRSs is greater or equal to a threshold value to meet the condition of the high-resolution speed estimation. In another aspect, the wireless node 604 may be configured to ensure that the PRSs have phase coherency to meet the condition of the high-resolution speed estimation.

In one aspect, a sensing measurement condition may be a condition to measure or estimate an AoA or an AoD of the received signal. In response, the wireless node 604 may be configured to configure an SSB and a CSI-RS to the sensing measurement, or be configured to configure a PRS and an SRS to the sensing measurement based on the sensing measurement condition. Estimation of the AoA or the AoD may not rely on a wide bandwidth of an RS. At 618, the wireless node 604 may enhance the PRS or the SRS. In one aspect, the sensing measurement condition may define an occasion for the wireless node 602 to perform MIMO sensing on the reference signals, for example to perform MIMO sensing to measure or estimate the AoA or the AoD of the received reference signal. In response, the wireless node 604 may configure a PRS or an SRS to be transmitted using a plurality of ports so that the wireless node 602 may perform MIMO sensing on the received PRS or the received SRS.

The wireless node 604 may use different RSs for different sensing measurements and/or for different sensing measurement reports. The request for the sensing measurement may indicate one or more sensing measurement reports. A sensing measurement report may be associated with one or more sensing measurement conditions, which may be used by the wireless node 604 to select a set of RSs for the report. In one aspect, the wireless node 604 may select a plurality of SSBs in response to a request to detect the target object 603 or to generate a target detection report associated with the target object 603. In one aspect, the wireless node 604 may select a plurality of PRSs in response to a request to estimate a range of the target object 603 from the wireless node 602 or to generate a range estimation report associated with the target object 603. In one aspect, the wireless node 604 may select a plurality of TRSs in response to a request to estimate a Doppler of the target object 603 or to generate a Doppler estimate of the target object 603. In one aspect, the wireless node 604 may select a plurality of CSI-RSs in response to a request to estimate an AoA or an AoD of a beam reflected by the target object 603, or to generate an angular estimation report.

The wireless node 604 may be configured to transmit a configuration or a selection 616 of the plurality of RSs to the wireless node 602. In one aspect, the wireless node 604 may transmit a configuration of a series of parameters that define a sensing instance including a plurality of RSs. For example, a CSI-RS, a PRS, and an SRS transmitted within a sensing instance with a periodicity, starting offset, and a duration for each of the RSs, or for the set of RSs. In one aspect, the wireless node 604 may transmit a selection of a configuration that was transmitted to the wireless node 602 at an earlier time. For example, the wireless node 604 may transmit a set of configurations 607 of a plurality of RSs to the wireless node 602, and the wireless node 604 may then select one of the set of configurations 607 at a later time. In some aspects, the wireless node 604 may transmit the set of configurations 607 in a radio resource control (RRC) configuration that includes the set of configurations 607. In some aspects, the wireless node 604 may transmit the configuration or the selection 616 as downlink control information (DCI) or a medium access control (MAC) control element (MAC-CE) that selects a configuration from the set of configurations transmitted in the RRC configuration. For example, an RRC configuration may include a set of sensing instances, where each sensing instance includes a configuration of a plurality of RSs for a sensing measurement or a sensing measurement report. The DCI or MAC-CE may select one of the sensing instances based on one or more factors, such as a sensing measurement to perform, a sensing measurement report to generate, or feedback from a sensing measurement report previously generated by the wireless node 602.

A sensing instance may be a series of RSs transmitted consecutively within a timer period. The wireless node 604 may transmit the plurality of RSs 620 as a sensing instance to the target object 603, which then reflects the reflected plurality of RSs 621 to the wireless node 602. At 614, the wireless node 604 may configure multiple sensing instances, where each sensing instance may have different content, for example, a different combination of RSs.

In some aspects, the wireless node 604 may split up the plurality of RSs in a series of instances for a single sensing measurement. For example, the wireless node 604 may transmit the plurality of RSs 620, may then communicate with the wireless node 602 (or a different wireless node) via the set of non-sensing transmissions 622, and then may transmit the plurality of RSs 624. In other words, the plurality of RSs 620 and the plurality of RSs 624 may both be associated with the same sensing measurement by the wireless node 602, but may be transmitted by the wireless node 604 at different times non-consecutively. While two sets of RSs are shown, a plurality of RSs may be divided into any number of non-consecutive transmissions, but associated with a same sensing measurement for the wireless node 602 to perform sensing upon.

The wireless node 604 may associate a plurality of RSs in any suitable manner. For example, the configuration or the selection 616 of the plurality of RSs may include an explicit indication of an association between a plurality of non-consecutive RSs and a sensing measurement by the wireless node 602 (e.g., a table that associates a sensing measurement with a set of RS IDs associated with the plurality of RSs, a quasi-co-location (QCL) indicator that indicates that two RSs are transmitted with a same beam). The configuration or the selection 616 of the plurality of RSs may include an implicit indication of an association between a plurality of non-consecutive RSs and a sensing measurement by the wireless node 602 (e.g., all RSs included in a sensing instance may be assumed to be associated with one another, or all RSs transmitted by a same or similar beam pattern (e.g., a beam pattern having a difference of less than 1 dB) may be assumed to be associated with one another).

At 626, the wireless node 602 may perform radar sensing on the plurality of RSs. In other words, the wireless node 602 may perform radar sensing on the reflected plurality of RSs 621 from the target object 603, and/or may perform radar sensing on the reflected plurality of RSs 625 from the target object 603. In some aspects, the wireless node 602 may fuse measurements of the plurality of RSs. For example, the wireless node 602 may fuse a measurement of a PRS and a CSI-RS for range estimation. In one aspect, the wireless node 602 may perform bandwidth stitching of a PRS and a CSI-RS to formulate a signal having a larger bandwidth. In another aspect, the wireless node 602 may interpolate measurements from a PRS and a CSI-RS. In another example, the wireless node 602 may fuse a measurement of an SSB and a CSI-RS for AoA estimation. In one aspect, the wireless node 602 may use an average of an AoA estimate from an SSB and a CSI-RS, or may use an AoA estimate from an SSB when a CSI-RS is not transmitted.

The wireless node 602 may track multiple objects with different Dopplers using a set of PRSs, but the range or angular resolution may be low using the set of PRSs. The wireless node 602 may receive an indication that the set of PRSs are associated with the set of CSI-RSs for sensing the target object 603, and may fuse a speed estimation using the PRSs with a range or angular estimation using the set of CSI-RSs to improve an overall sensing performance of the target object 603 using both the set of PRSs and the set of CSI-RSs.

At 628, the wireless node 602 may configure a new sensing measurement based upon performing sensing at 626. The wireless node 602 may then transmit a request 608 for a sensing measurement based on the configuration. For example, the wireless node 602 may initially be configured to perform target detection on the target object 603 using a plurality of SSBs, which may use a narrow-band RS. The wireless node 602 may estimate an AoA or an AoD using the plurality of SSBs to determine a general direction of the target object 603 with respect to the wireless node 602. The wireless node 602 may then request a PRS and a CSI-RS from the wireless node 604, which may use a wide-band RS with respect to the SSBs. The wireless node 602 may configure the PRS and a CSI-RS based on the radar sensing performed at 626. This may enhance the ability for the wireless node 602 to perform range estimation on the target object 603.

In another example, the wireless node 602 may initially be configured to perform target detection on the target object 603 using a set of RSs having a dense time-domain. The wireless node 602 may estimate a speed of the target object 603 using the set of RSs having a dense time-domain to determine a coarse speed of the target object 603 with respect to the wireless node 602. The wireless node 602 may then request an RS with a specific, less dense, time-domain pattern to improve its speed estimate of the target object 603. The wireless node 602 may configure the specific time-domain pattern based on the radar sensing performed at 626.

In some aspects, the wireless node 602 may transmit a sensing measurement report 630 to the wireless node 604. The wireless node 604 may receive the sensing measurement report 630 from the wireless node 602. The sensing measurement report may include an indication of what measurement results are associated with what RSs. For example, a range estimate result with a PRS or a speed estimate result with a TRS. The report may include an RS type and/or a resource ID associated with each measurement result. At 634, the wireless node 604 may configure a sensing measurement based on the sensing measurement report 630. For example, at 634, the wireless node 604 may dynamically guide resource allocations of the plurality of RSs for sensing based on the dynamically reported sensing measurement report 630 from the wireless node 602. At 614, the wireless node 604 may configure a new set of RSs and transmit them to the target object 603 based on the sensing measurement report 630. In some aspects, at 634, the wireless node 604 may configure a sensing measurement in response to a trigger other than the sensing measurement report 630. For example, the wireless node 604 may configure the sensing measurement based on a potential for the plurality of RSs 620 to interfere with one or more communications operations at the wireless node 604 or the wireless node 602. For example, if the wireless node 604 determines that communication is a higher priority than sensing, the wireless node 604 may increase bandwidth for communication signals and decrease bandwidth for sensing RSs. In another example, if the wireless node 604 determines that sensing is a higher priority than communication, the wireless node 604 may increase bandwidth for sensing RSs and decrease bandwidth for communication signals. In some aspects, the wireless node 604 may configure a plurality of RSs by selecting a sensing instance from a set of sensing instances, where each sensing instance includes a configured plurality of RSs.

In some aspects, the wireless node 602 may transmit a sensing measurement report 632 to the sensing entity 606. The sensing entity 606 may receive the sensing measurement report 632 from the wireless node 602. At 636, the sensing entity 606 may configure a sensing measurement based on the sensing measurement report 632. The sensing entity 606 may transmit a request 610 to the wireless node 604 based on the sensing measurement report 632.

While the connection flow diagram 600 shows the wireless node 602 measuring reflected RSs and the wireless node 604 configuring and transmitting the RSs for reflection by the target object 603, a plurality of wireless nodes may measure the reflected RSs and/or a plurality of wireless nodes may configure and transmit RSs for reflection by the target object 603. In other words, while the connection flow diagram 600 shows bistatic sensing, such a configuration may be adapted for multi-static sensing.

Figure 7:
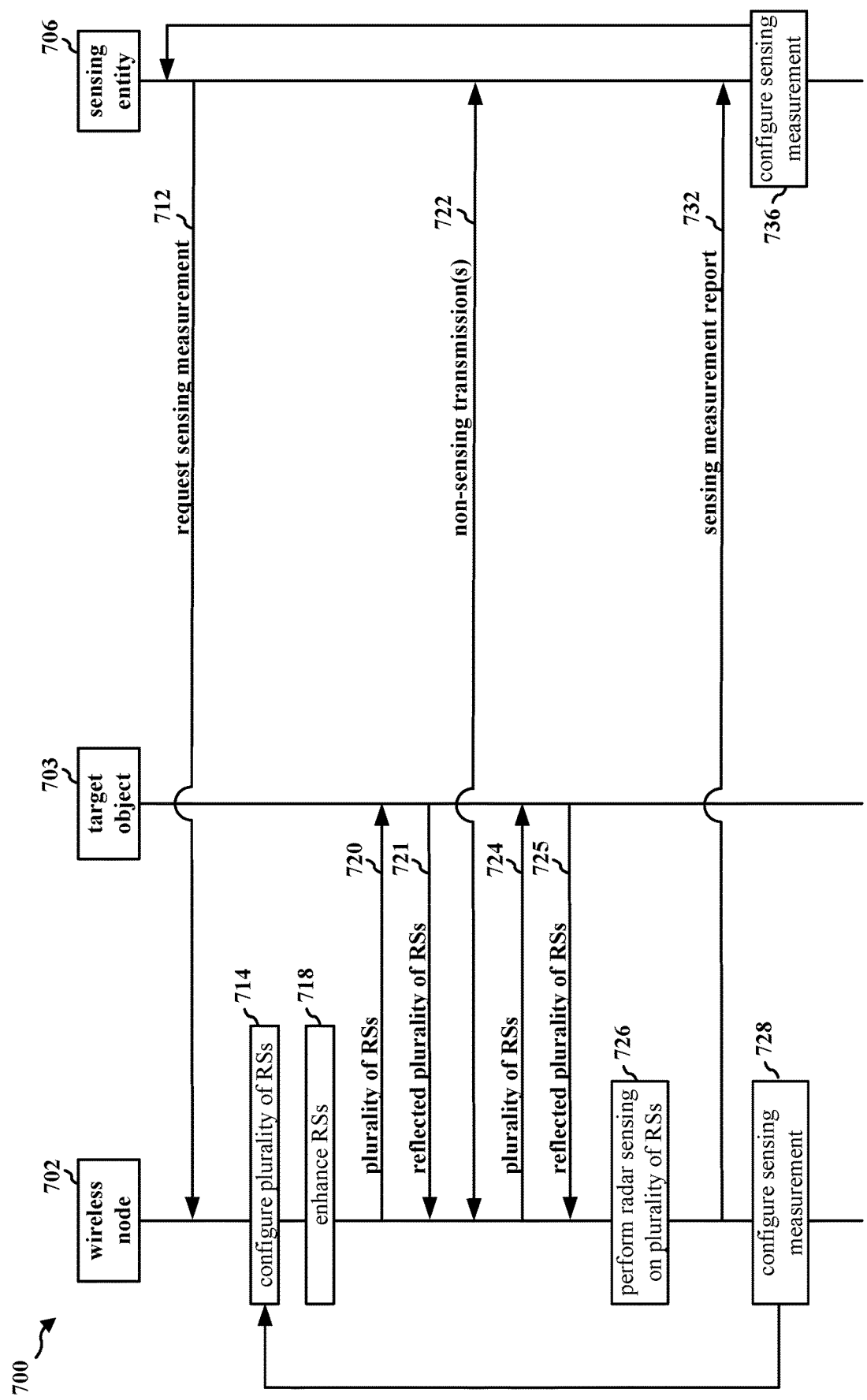
FIG. 7 is a connection flow diagram illustrating an example of monostatic sensing.

FIG. 7 is a connection flow diagram 700 illustrating a wireless node 702 configured to perform monostatic sensing on a target object 703. The wireless node 702 may transmit the plurality of RSs 720 to the target object 703. The target object 703 may reflect the plurality of RSs 720 as the reflected plurality of RSs 721 back to the wireless node 702. At 726, the wireless node 702 may perform radar sensing on the reflected plurality of RSs 721 to calculate one or more parameters of the target object 703 relative to the wireless node 702. In one aspect, the wireless node 702 may estimate a range of the target object 703 from the wireless node 702 based on a time difference between transmission of the plurality of RSs 720 from the wireless node 702 and reception of the reflected plurality of RSs 721 at the wireless node 702. In one aspect, the wireless node 702 may estimate a velocity of the target object 703 by estimating the range of the target object from the wireless node 702 at one time, and then by estimating the range of the target object from the wireless node 702 at another time.

The wireless node 702 may be configured to configure a plurality of RSs for sensing based on a set of sensing measurement conditions for radar sensing. The wireless node 702 may be configured to output the configuration of the plurality of RSs based on a set of sensing measurement conditions to a transmission module, which transmits the plurality of RSs 720 and/or the plurality of RSs 724. The wireless node 702 may select and/or configure the plurality of RSs based on the set of sensing measurement conditions. The wireless node 702 may transmit the plurality of RSs 720 for the radar sensing based on the configuration of the plurality of RSs at 714. The plurality of RSs 720 may reflect off of the target object 703 as the reflected plurality of RSs 721. The wireless node 702 may receive the reflected plurality of RSs 721 from the target object 703. At 726, the wireless node 702 may perform radar sensing on the reflected plurality of RSs 721 based on the configuration.

In one aspect, a sensing entity 706 may transmit a request 712 for a sensing measurement to the wireless node 702, indicating to the wireless node 702 to configure and transmit the plurality of RSs 720, and to receive and measure the reflected plurality of RSs 721. A request for a sensing measurement may include one or more sensing measurement conditions and/or one or more sensing reports. In some aspects, the wireless node 702 may configure the plurality of RSs in response to a determination to perform a sensing measurement, or to generate a sensing measurement report.

At 714, the wireless node 702 may configure a plurality of RSs for a sensing measurement. The wireless node 702 may be configured to take the set of sensing measurement conditions into consideration by allocating a plurality of RSs to a sensing measurement occasion based on the set of sensing measurement conditions. At 718, the wireless node 702 may enhance one or more of the plurality of RSs based on the set of sensing measurement conditions. For example, the wireless node 702 may enhance the one or more of the plurality of RSs to ensure that the enhanced RS may be used to perform a sensing measurement that satisfies one of the set of sensing measurement conditions.

In one aspect, a sensing measurement condition may be a condition to support a high resolution range measurement. In other words, the sensing measurement condition may be a range resolution that is less than or equal to a requisite range resolution threshold. In response, the wireless node 702 may be configured to configure at least one CSI-RS, at least one PRS, and at least one SRS to the sensing measurement such that each of the at least one CSI-RS, at least one PRS, and at least one SRS are configured to satisfy the sensing measurement condition to support the resolution range measurement.

In one aspect, a sensing measurement condition may be a condition to support a high resolution speed. In other words, the sensing measurement condition may be a velocity resolution that is less than or equal to a requisite velocity resolution threshold. In response, the wireless node 702 may be configured to configure at least two TRSs or at least two PRSs to the sensing measurement based on the sensing measurement condition. At 718, the wireless node 702 may enhance the at least two TRSs or the at least two PRSs based on the sensing measurement condition. For example, the wireless node 702 may enhance the at least two TRSs or the at least two PRSs to ensure that a sensing measurement of the configured RSs satisfies the sensing measurement condition. In one aspect, the wireless node 702 may be configured to enhance the phase coherency duration of the TRSs to meet a condition of a high-resolution speed estimation. In other words, the wireless node 702 may be configured to ensure that the phase coherency duration of the TRSs is greater or equal to a threshold value to meet the condition of the high-resolution speed estimation. In another aspect, the wireless node 702 may be configured to ensure that the PRSs have phase coherency to meet the condition of the high-resolution speed estimation. In one aspect, a sensing measurement condition may be a condition to measure or estimate an AoA or an AoD of the received signal. In response, the wireless node 702 may be configured to configure an SSB and a CSI-RS to the sensing measurement, or be configured to configure a PRS and an SRS to the sensing measurement based on the sensing measurement condition. Estimation of the AoA or the AoD may not rely on a wide bandwidth of an RS. At 718, the wireless node 702 may enhance the PRS or the SRS. In one aspect, the sensing measurement condition may define an occasion for the wireless node 702 to perform MIMO sensing on the reference signals, for example to perform MIMO sensing to measure or estimate the AoA or the AoD of the received reference signal. In response, the wireless node 702 may configure a PRS or an SRS to be transmitted using a plurality of ports so that the wireless node 702 may perform MIMO sensing on the received PRS or the received SRS.

The wireless node 702 may use different RSs for different sensing measurements and/or for different sensing measurement reports. The request for the sensing measurement may indicate one or more sensing measurement reports. A sensing measurement report may be associated with one or more sensing measurement conditions, which may be used by the wireless node 702 to select a set of RSs for the report. In one aspect, the wireless node 702 may select a plurality of SSBs in response to a request to detect the target object 703 or to generate a target detection report associated with the target object 703. In one aspect, the wireless node 702 may select a plurality of PRSs in response to a request to estimate a range of the target object 703 or to generate a range estimation report associated with the target object 703. In one aspect, the wireless node 702 may select a plurality of TRSs in response to a request to estimate a Doppler of the target object 703 or to generate a Doppler estimate of the target object 703. In one aspect, the wireless node 702 may select a plurality of CSI-RSs in response to a request to estimate an AoA or an AoD of a beam reflected by the target object 703, or to generate an angular estimation report.

The wireless node 702 may be configured to output a configuration of the plurality of RSs to a module that transmits the plurality of RSs, such as a transceiver. In one aspect, the wireless node 702 may output a configuration of a series of parameters that define a sensing instance including a plurality of RSs. For example, a CSI-RS, a PRS, and an SRS transmitted within a sensing instance with a periodicity, starting offset, and a duration for each of the RSs, or for the set of RSs. In one aspect, the wireless node 702 may output a selection of a configuration that was configured at an earlier time. For example, the wireless node 702 may output a set of configurations to a storage area, or may receive the set of configurations from the sensing entity 706 as the request 712, and the wireless node 702 may then select one of the set of configurations at a later time.

A sensing instance may be a series of RSs transmitted consecutively within a timer period. The wireless node 702 may transmit the plurality of RSs 720 as a sensing instance to the target object 703, which then reflects the reflected plurality of RSs 721 back to the wireless node 702. At 714, the wireless node 702 may configure multiple sensing instances, where each sensing instance may have different content, for example, a different combination of RSs.

In some aspects, the wireless node 702 may split up the plurality of RSs in a series of instances for a single sensing measurement. For example, the wireless node 702 may transmit the plurality of RSs 720, may then communicate with the sensing entity 706 (or a different wireless node) via the set of non-sensing transmissions 722, and then may transmit the plurality of RSs 724. In other words, the plurality of RSs 720 and the plurality of RSs 724 may both be associated with the same sensing measurement by the wireless node 702, but may be transmitted by the wireless node 702 at different times non-consecutively. While two sets of RSs are shown, a plurality of RSs may be divided into any number of non-consecutive transmissions, but associated with a same sensing measurement for the wireless node 702 to perform sensing upon.

The wireless node 702 may associate a plurality of RSs in any suitable manner. For example, the configuration of the plurality of RSs may include an explicit indication of an association between a plurality of non-consecutive RSs and a sensing measurement by the wireless node 702 (e.g., a table that associates a sensing measurement with a set of RS IDs associated with the plurality of RSs, a quasi-co-location (QCL) indicator that indicates that two RSs are transmitted with a same beam). The configuration of the plurality of RSs may include an implicit indication of an association between a plurality of non-consecutive RSs and a sensing measurement by the wireless node 702 (e.g., all RSs included in a sensing instance may be assumed to be associated with one another, or all RSs transmitted by a same or similar beam pattern may be assumed to be associated with one another).

At 726, the wireless node 702 may perform radar sensing on the plurality of RSs. In other words, the wireless node 702 may perform radar sensing on the reflected plurality of RSs 721 from the target object 703, and/or may perform radar sensing on the reflected plurality of RSs 725 from the target object 703. In some aspects, the wireless node 702 may fuse measurements of the plurality of RSs. For example, the wireless node 702 may fuse a measurement of a PRS and a CSI-RS for range estimation. In another aspect, the wireless node 702 may track multiple objects with different Dopplers using a set of PRSs, but the range or angular resolution may be low using the set of PRSs. The wireless node 702 may receive an indication that the set of PRSs are associated with the set of CSI-RSs for sensing the target object 703, and may fuse a speed estimation using the PRSs with a range or angular estimation using the set of CSI-RSs to improve an overall sensing performance of the target object 703 using both the set of PRSs and the set of CSI-RSs.

At 728, the wireless node 702 may configure a new sensing measurement based upon performing sensing at 726. The wireless node 702 may then configure a second plurality of RSs at 714 based on performing sensing at 726. For example, the wireless node 702 may initially be configured to perform target detection on the target object 703 using a plurality of SSBs, which may use a narrow-band RS. The wireless node 702 may estimate an AoA or an AoD using the plurality of SSBs to determine a general direction of the target object 703 with respect to the wireless node 702. The wireless node 702 may then configure a PRS and a CSI-RS at 714, which may use a wide-band RS with respect to the SSBs. The wireless node 702 may configure the PRS and a CSI-RS based on the radar sensing performed at 726. This may enhance the ability for the wireless node 702 to perform range estimation on the target object 703.

In another example, the wireless node 702 may initially be configured to perform target detection on the target object 703 using a set of RSs having a dense time-domain. The wireless node 702 may estimate a speed of the target object 703 using the set of RSs having a dense time-domain to determine a coarse speed of the target object 703 with respect to the wireless node 702. The wireless node 702 may then, at 714, configure an RS with a specific, less dense, time-domain pattern to improve its speed estimate of the target object 703. The wireless node 702 may configure the specific time-domain pattern based on the radar sensing performed at 726.

In some aspects, the wireless node 702 may transmit a sensing measurement report 732 to the sensing entity 706. The sensing entity 706 may receive the sensing measurement report 732 from the wireless node 702. At 736, the sensing entity 706 may configure a sensing measurement based on the sensing measurement report 732. The sensing entity 706 may transmit a request 712 to the wireless node 702 based on the sensing measurement report 732.

While the connection flow diagram 700 shows the wireless node 702 measuring reflected RSs and the wireless node 702 configuring and transmitting the RSs for reflection by the target object 703, a plurality of wireless nodes may measure the reflected RSs and/or a plurality of wireless nodes may configure and transmit RSs for reflection by the target object 703. In other words, while the connection flow diagram 700 shows monostatic sensing, such a configuration may be adapted for multi-static sensing. The wireless node 702 may measure reflected RSs originating from one or more other wireless nodes different than the wireless node 702. The wireless node 702 may transmit the plurality of RSs 720 and/or the plurality of RSs 724, and the reflected RSs may be received and measured by other wireless nodes different than the wireless node 702.

Figure 8:
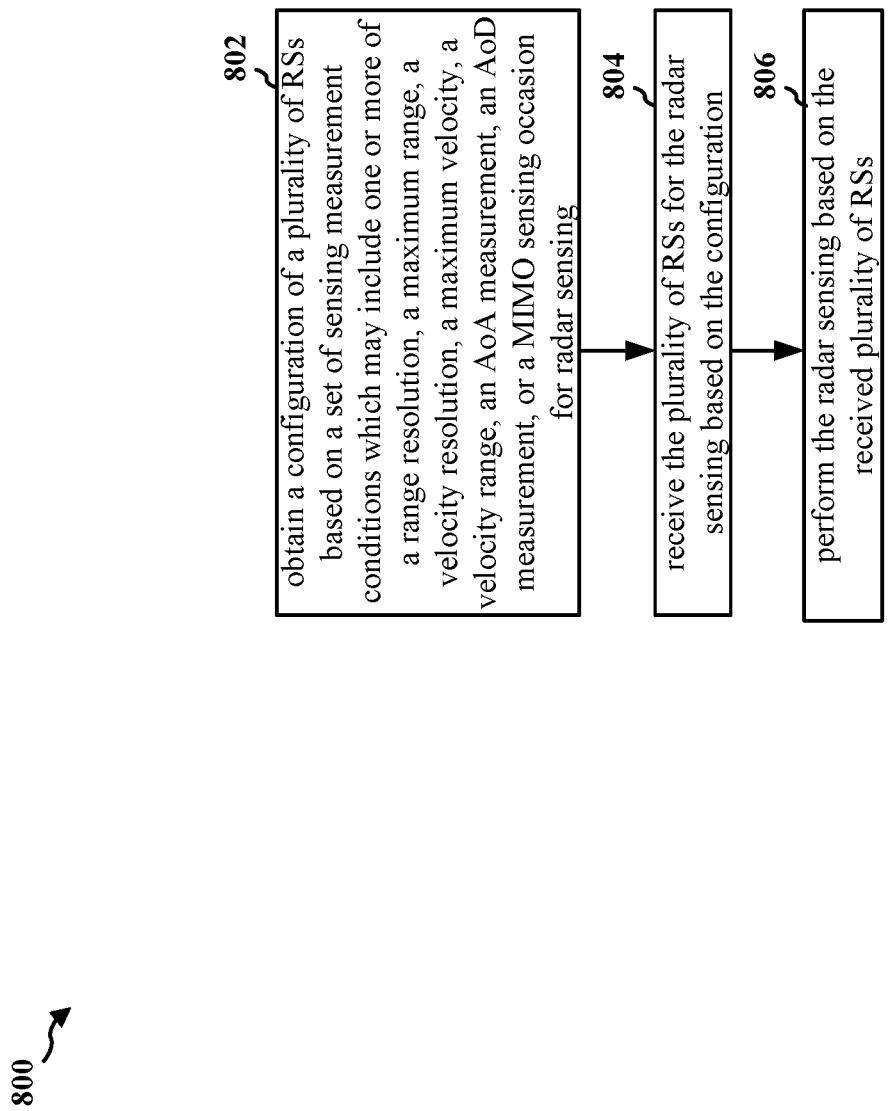
FIG. 8 is a flowchart of a method of wireless communication.

FIG. 8 is a flowchart 800 of a method of wireless communication. The method may be performed by a wireless node (e.g., the UE 104, the UE 350, the UE 404; the wireless node 502, the wireless node 504, the wireless node 602, the wireless node 702; the apparatus 1204). At 802, the wireless node may receive a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. For example, 802 may be performed by the wireless node 602 in FIG. 6, which may receive a configuration or a selection 616 of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. Moreover, 802 may be performed by the component 198 in FIG. 12.

At 804, the wireless node may receive the plurality of RSs for the radar sensing based on the configuration. For example, 804 may be performed by the wireless node 602 in FIG. 6, which may receive the reflected plurality of RSs 621 for the radar sensing at 626 based on the configuration. Moreover, 804 may be performed by the component 198 in FIG. 12.

At 806, the wireless node may perform the radar sensing based on the received plurality of RSs. For example, 806 may be performed by the wireless node 602 in FIG. 6, which may perform the radar sensing at 626 based on the reflected plurality of RSs 621. Moreover, 806 may be performed by the component 198 in FIG. 12.

Figure 9:
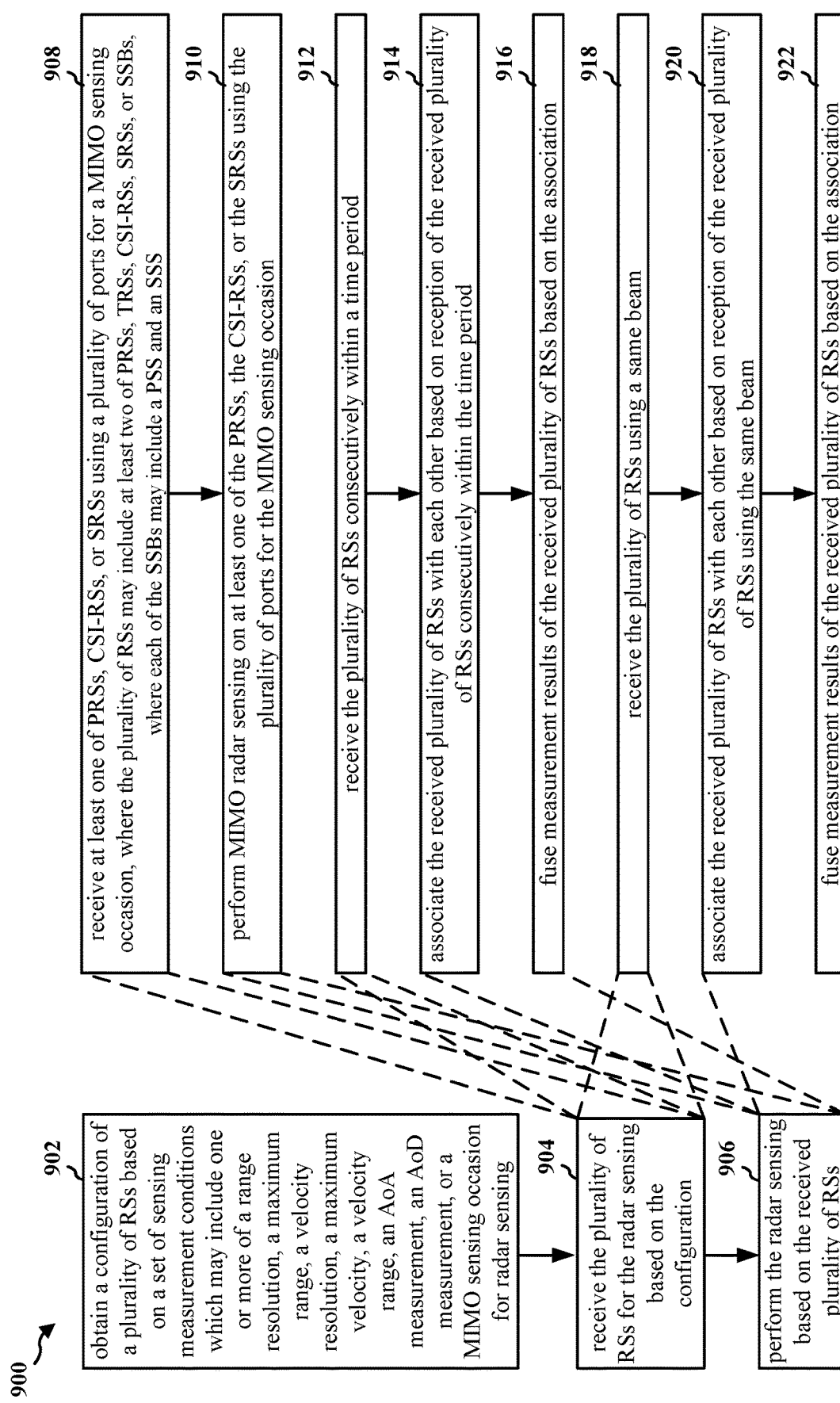
FIG. 9 is a flowchart of a method of wireless communication.

FIG. 9 is a flowchart 900 of a method of wireless communication. The method may be performed by a wireless node (e.g., the UE 104, the UE 350, the UE 404; the wireless node 502, the wireless node 504, the wireless node 602, the wireless node 702; the apparatus 1204). At 902, the wireless node may receive a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. For example, 902 may be performed by the wireless node 602 in FIG. 6, which may receive a configuration or a selection 616 of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. Moreover, 902 may be performed by the component 198 in FIG. 12.

At 904, the wireless node may receive the plurality of RSs for the radar sensing based on the configuration. For example, 904 may be performed by the wireless node 602 in FIG. 6, which may receive the reflected plurality of RSs 621 for the radar sensing at 626 based on the configuration. Moreover, 904 may be performed by the component 198 in FIG. 12.

At 906, the wireless node may perform the radar sensing based on the received plurality of RSs. For example, 906 may be performed by the wireless node 602 in FIG. 6, which may perform the radar sensing at 626 based on the reflected plurality of RSs 621. Moreover, 906 may be performed by the component 198 in FIG. 12.

At 908, the wireless node may receive at least one of PRSs, CSI-RSs, or SRSs using a plurality of ports for a MIMO sensing occasion. The plurality of RSs may include at least two of PRSs. TRSs, CSI-RSs, SRSs, or SSBs. Each of the SSBs may include a PSS and an SSS. For example, 908 may be performed by the wireless node 602 in FIG. 6, which may receive the reflected plurality of RSs 621 as at least one of PRSs, CSI-RSs, or SRSs using a plurality of ports for a MIMO sensing occasion. The plurality of RSs may include at least two of PRSs, TRSs, CSI-RSs, SRSs, or SSBs. Each of the SSBs may include a PSS and an SSS. Moreover, 908 may be performed by the component 198 in FIG. 12.

At 910, the wireless node may perform MIMO radar sensing on at least one of the PRSs, the CSI-RSs, or the SRSs using the plurality of ports for the MIMO sensing occasion. For example, 910 may be performed by the wireless node 602 in FIG. 6, which may, at 626, perform MIMO radar sensing on at least one of the PRSs, the CSI-RSs, or the SRSs using the plurality of ports for the MIMO sensing occasion. Moreover, 910 may be performed by the component 198 in FIG. 12.

At 912, the wireless node may receive the plurality of RSs consecutively within a time period. For example, 912 may be performed by the wireless node 602 in FIG. 6, which may receive the reflected plurality of RSs 621 consecutively within a time period. Moreover, 912 may be performed by the component 198 in FIG. 12.

At 914, the wireless node may associate the received plurality of RSs with each other based on reception of the received plurality of RSs consecutively within the time period. For example, 914 may be performed by the wireless node 602 in FIG. 6, which may associate the reflected plurality of RSs 621 with each other based on reception of the received plurality of RSs consecutively within the time period. Moreover, 914 may be performed by the component 198 in FIG. 12.

At 916, the wireless node may fuse measurement results of the received plurality of RSs based on the association. For example, 916 may be performed by the wireless node 602 in FIG. 6, which may fuse measurement results of the reflected plurality of RSs 621 and the reflected plurality of RSs 624 based on an association between the plurality of RSs 620 and the plurality of RSs 624. Moreover, 916 may be performed by the component 198 in FIG. 12.

At 918, the wireless node may receive the plurality of RSs using a same beam. For example, 918 may be performed by the wireless node 602 in FIG. 6, which may receive the reflected plurality of RSs 621 and the reflected plurality of RSs 625 using a same beam. Moreover, 918 may be performed by the component 198 in FIG. 12.

At 920, the wireless node may associate the received plurality of RSs with each other based on reception of the received plurality of RSs using the same beam. For example, 920 may be performed by the wireless node 602 in FIG. 6, which may associate the reflected plurality of RSs 621 and the reflected plurality of RSs 625 with each other based on reception of the reflected plurality of RSs 621 and the reflected plurality of RSs 625 using the same beam. Moreover, 920 may be performed by the component 198 in FIG. 12.

At 922, the wireless node may fuse measurement results of the received plurality of RSs based on an association. For example, 922 may be performed by the wireless node 602 in FIG. 6, which may fuse measurement results of the reflected plurality of RSs 621 and the reflected plurality of RSs 625 based on an association between the plurality of RSs 620 and the plurality of RSs 624. Moreover, 922 may be performed by the component 198 in FIG. 12.

Figure 10:
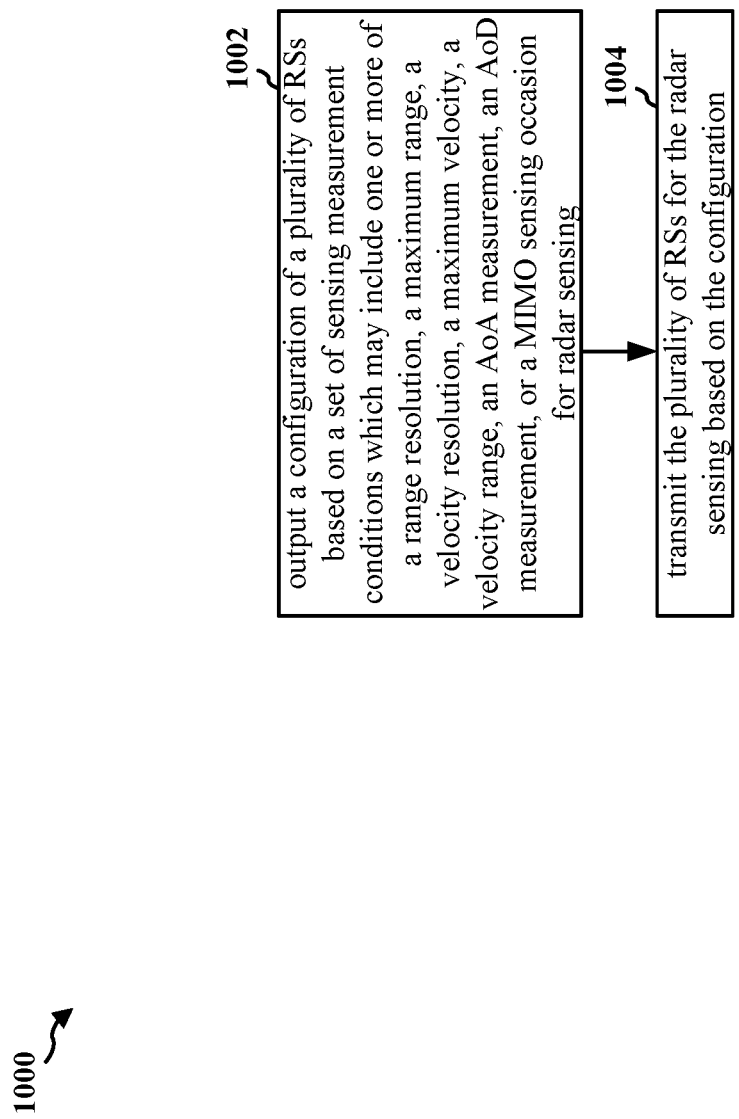
FIG. 10 is a flowchart of a method of wireless communication.

FIG. 10 is a flowchart 1000 of a method of wireless communication. The method may be performed by a wireless node (e.g., the base station 102, the base station 310; the TRP 402, the TRP 406; the wireless node 502, the wireless node 506, the wireless node 508, the wireless node 604, the wireless node 702; the network entity 1202, the network entity 1302, the network entity 1460). At 1002, the wireless node may transmit a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. For example, 1002 may be performed by the wireless node 604 in FIG. 6, which may transmit a configuration or a selection 616 of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. Moreover, 1002 may be performed by the component 199 in FIG. 13 or 14.

At 1004, the wireless node may transmit the plurality of RSs for the radar sensing based on the configuration. For example, 1004 may be performed by the wireless node 604 in FIG. 6, which may transmit the plurality of RSs 620 for the radar sensing at 626 based on the configuration or selection 616 of the plurality of RSs. Moreover, 1004 may be performed by the component 199 in FIG. 13 or 14.

Figure 11:
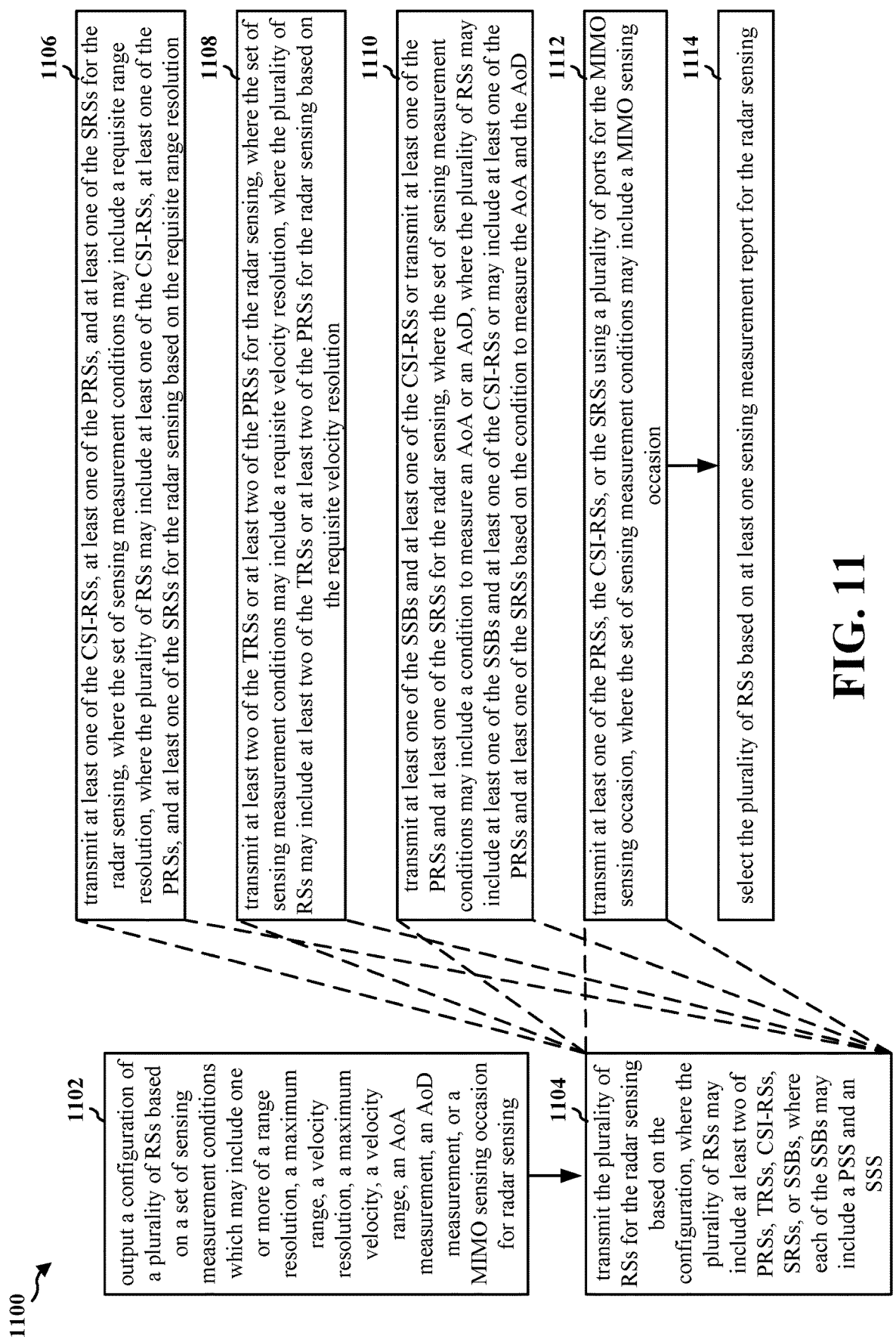
FIG. 11 is a flowchart of a method of wireless communication.

FIG. 11 is a flowchart 1100 of a method of wireless communication. The method may be performed by a wireless node (e.g., the base station 102, the base station 310; the TRP 402, the TRP 406; the wireless node 502, the wireless node 506, the wireless node 508, the wireless node 604, the wireless node 702; the network entity 1202, the network entity 1302, the network entity 1460). At 1102, the wireless node may transmit a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. For example, 1102 may be performed by the wireless node 604 in FIG. 6, which may transmit a configuration or a selection 616 of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. Moreover, 1102 may be performed by the component 199 in FIG. 13 or 14.

At 1104, the wireless node may transmit the plurality of RSs for the radar sensing based on the configuration. The plurality of RSs may include at least two of PRSs, TRSs, CSI-RSs, SRSs, or SSBs. Each of the SSBs may include a PSS and an SSS. For example, 1104 may be performed by the wireless node 604 in FIG. 6, which may transmit the plurality of RSs 620 for the radar sensing at 626 based on the configuration or selection 616 of the plurality of RSs. The plurality of RSs may include at least two of PRSs, TRSs, CSI-RSs, SRSs, or SSBs. Each of the SSBs may include a PSS and an SSS. Moreover, 1104 may be performed by the component 199 in FIG. 13 or 14.

At 1106, the wireless node may transmit at least one of the CSI-RSs, at least one of the PRSs, and at least one of the SRSs for the radar sensing. The set of sensing measurement conditions may include a requisite range resolution. The plurality of RSs may include at least one of the CSI-RSs, at least one of the PRSs, and at least one of the SRSs for the radar sensing based on the requisite range resolution. For example, 1106 may be performed by the wireless node 604 in FIG. 6, which may transmit at least a portion of the plurality of RSs 620 as at least one of a CSI-RS, at least one of a PRS, and at least one of an SRS for the radar sensing. The set of sensing measurement conditions may include a requisite range resolution. The plurality of RSs may include at least one of the CSI-RSs, at least one of the PRSs, and at least one of the SRSs for the radar sensing based on the requisite range resolution. Moreover, 1106 may be performed by the component 199 in FIG. 13 or 14.

At 1108, the wireless node may transmit at least two of the TRSs or at least two of the PRSs for the radar sensing. The set of sensing measurement conditions may include a requisite velocity resolution. The plurality of RSs may include at least two of the TRSs or at least two of the PRSs for the radar sensing based on the requisite velocity resolution. For example, 1108 may be performed by the wireless node 604 in FIG. 6, which may transmit at least a portion of the plurality of RSs 620 as at least two of the TRSs or at least two of the PRSs for the radar sensing. The set of sensing measurement conditions may include a requisite velocity resolution. The plurality of RSs may include at least two of the TRSs or at least two of the PRSs for the radar sensing based on the requisite velocity resolution. Moreover, 1108 may be performed by the component 199 in FIG. 13 or 14.

At 1110, the wireless node may transmit at least one of the SSBs and at least one of the CSI-RSs or transmit at least one of the PRSs and at least one of the SRSs for the radar sensing. The set of sensing measurement conditions may include a condition to measure an AoA or an AoD. The plurality of RSs may include at least one of the SSBs and at least one of the CSI-RSs or may include at least one of the PRSs and at least one of the SRSs based on the condition to measure the AoA and the AoD. For example, 1110 may be performed by the wireless node 604 in FIG. 6, which may transmit at least a portion of the plurality of RSs 620 as at least one of the SSBs and at least one of the CSI-RSs or transmit at least one of the PRSs and at least one of the SRSs for the radar sensing. The set of sensing measurement conditions may include a condition to measure an AoA or an AoD. The plurality of RSs may include at least one of the SSBs and at least one of the CSI-RSs or may include at least one of the PRSs and at least one of the SRSs based on the condition to measure the AoA and the AoD. Moreover, 1110 may be performed by the component 199 in FIG. 13 or 14.

At 1112, the wireless node may transmit at least one of the PRSs, the CSI-RSs, or the SRSs using a plurality of ports for the MIMO sensing occasion. The set of sensing measurement conditions may include a MIMO sensing occasion. For example, 1112 may be performed by the wireless node 604 in FIG. 6, which may transmit at least a portion of the plurality of RSs 620 as at least one of the PRSs, the CSI-RSs, or the SRSs using a plurality of ports for the MIMO sensing occasion. The set of sensing measurement conditions may include a MIMO sensing occasion. Moreover, 1112 may be performed by the component 199 in FIG. 13 or 14.

At 1114, the wireless node may select the plurality of RSs based on at least one sensing measurement report for the radar sensing. For example, 1114 may be performed by the wireless node 604 in FIG. 6, which may, at 634, configure a sensing measurement, which may select a plurality of RSs, based on the sensing measurement report 630 from the wireless node 602. Moreover, 1114 may be performed by the component 199 in FIG. 13 or 14.

Figure 12:
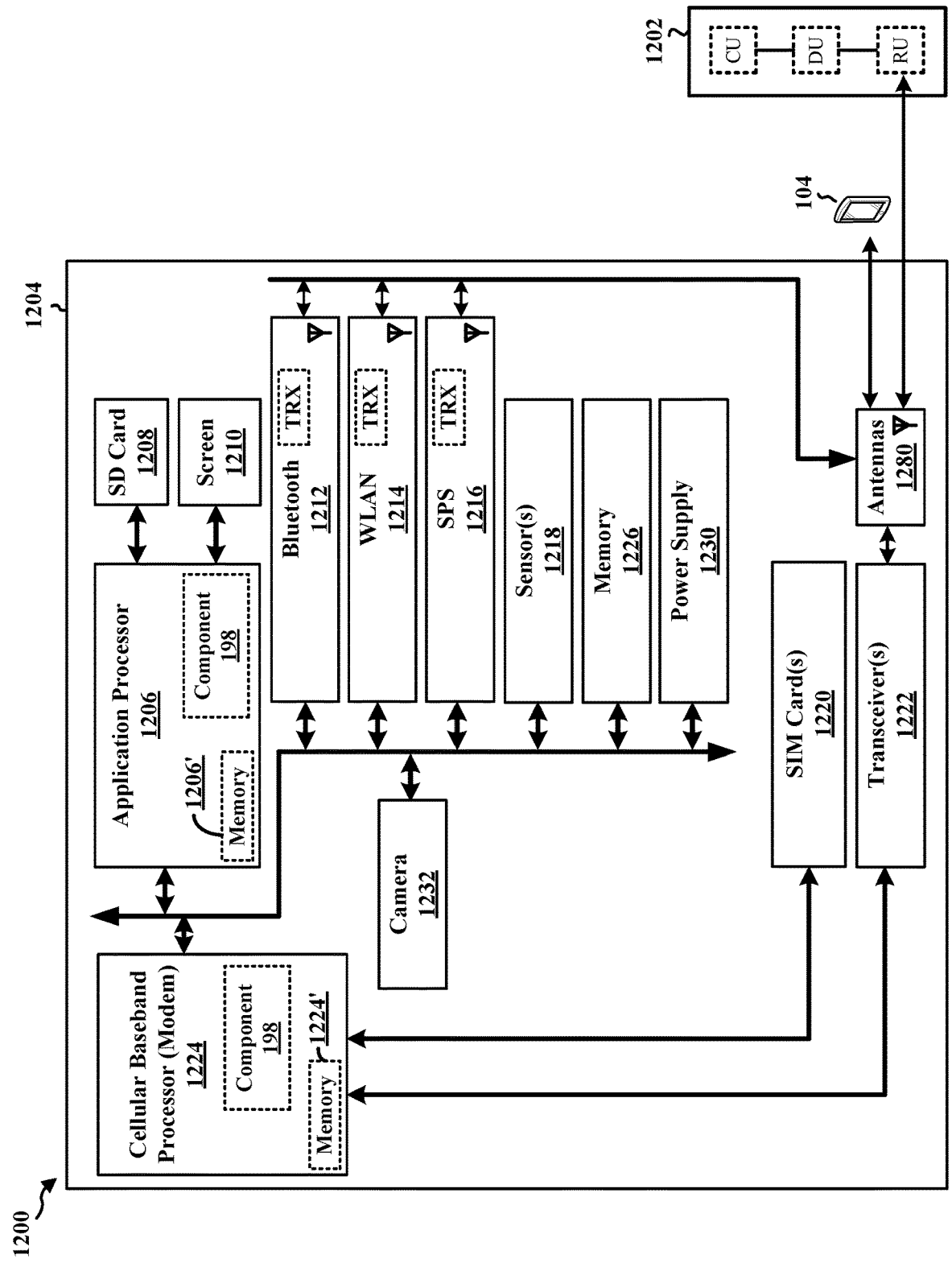
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1004 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (Rx)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the Tx processor 368, the Rx processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to obtain a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. The component 198 may be configured to receive the plurality of RSs for the radar sensing based on the configuration. The component 198 may be configured to perform the radar sensing based on the received plurality of RSs. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for obtaining a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. The apparatus 1204 may include means for receiving the plurality of RSs for the radar sensing based on the configuration. The apparatus 1204 may include means for performing the radar sensing based on the received plurality of RSs. The apparatus 1204 may include means for receiving the plurality of RSs by receiving at least one of the CSI-RSs, at least one of the PRSs, and at least one of the SRSs for the radar sensing. The apparatus 1204 may include means for performing the radar sensing by performing the radar sensing on at least one of the CSI-RSs, at least one of the PRSs, and at least one of the SRSs. The apparatus 1204 may include means for receiving the plurality of RSs by receiving at least two of the TRSs or at least two of the PRSs for the radar sensing. The apparatus 1204 may include means for performing the radar sensing by performing the radar sensing on at least two of the TRSs or at least two of the PRSs. The apparatus 1204 may include means for receiving the plurality of RSs by receiving at least one of the SSBs and at least one of the CSI-RSs for the radar sensing. The apparatus 1204 may include means for receiving the plurality of RSs by receiving at least one of the PRSs and at least one of the SRSs for the radar sensing. The apparatus 1204 may include means for performing the radar sensing by performing the radar sensing on at least one of the SSBs and at least one of the CSI-RSs or on at least one of the PRSs and at least one of the SRSs. The apparatus 1204 may include means for receiving the plurality of RSs by receiving at least one of the PRSs, the CSI-RSs, or the SRSs using a plurality of ports for the MIMO sensing occasion. The apparatus 1204 may include means for performing the radar sensing by performing MIMO radar sensing on at least one of the PRSs, the CSI-RSs, or the SRSs using the plurality of ports for the MIMO sensing occasion. The apparatus 1204 may include means for receiving the plurality of RSs based on the configuration by receiving the plurality of RSs based on the periodicity, the starting offset, and the duration. The apparatus 1204 may include means for receiving the plurality of RSs for the radar sensing by receiving the plurality of RSs consecutively within a time period. The apparatus 1204 may include means for performing the radar sensing based on the received plurality of RSs by associating the received plurality of RSs with each other based on reception of the received plurality of RSs consecutively within the time period. The apparatus 1204 may include means for performing the radar sensing based on the received plurality of RSs by fusing measurement results of the received plurality of RSs based on the association. The apparatus 1204 may include means for receiving the plurality of RSs for the radar sensing by receiving the plurality of RSs using a same beam. The apparatus 1204 may include means for performing the radar sensing based on the received plurality of RSs by associating the received plurality of RSs with each other based on reception of the received plurality of RSs using the same beam. The apparatus 1204 may include means for performing the radar sensing based on the received plurality of RSs by fusing measurement results of the received plurality of RSs based on the association. The apparatus 1204 may include means for performing the radar sensing based on the received plurality of RSs by fusing measurement results of the received plurality of RSs based on the indicator of the association between the plurality of RSs. The apparatus 1204 may include means for transmitting at least one sensing measurement report based on the radar sensing. The apparatus 1204 may include means for transmitting a sensing request associated with a second set of sensing measurement conditions based on the radar sensing. The apparatus 1204 may include means for obtaining a second configuration of a second plurality of RSs based on the second set of sensing measurement conditions for a second radar sensing. The apparatus 1204 may include means for receiving the second plurality of RSs for the second radar sensing based on the second configuration. The apparatus 1204 may include means for performing the second radar sensing based on the received second plurality of RSs. The apparatus 1204 may include means for transmitting at least one sensing measurement report based on the radar sensing. The apparatus 1204 may include means for obtaining a second configuration of a second plurality of RSs based on the at least one sensing measurement report. The apparatus 1204 may include means for receiving the second plurality of RSs for a second radar sensing based on the second configuration. The apparatus 1204 may include means for performing the second radar sensing based on the received second plurality of RSs. The apparatus 1204 may include means for obtaining a second configuration of a second plurality of RSs based on an indication of a conflict between the radar sensing and a communication occasion. The apparatus 1204 may include means for receiving the second plurality of RSs for a second radar sensing based on the second configuration. The apparatus 1204 may include means for performing the second radar sensing based on the received second plurality of RSs. The apparatus 1204 may include means for obtaining the configuration of the plurality of RSs may include obtaining a set of configurations. Each of the set of configurations may be associated with a distinct plurality of RSs. The apparatus 1204 may include means for transmitting at least one sensing measurement report based on the radar sensing. The apparatus 1204 may include means for obtaining an indicator of a selection of a second configuration from the set of configurations based on the at least one sensing measurement report. The apparatus 1204 may include means for receiving a second plurality of RSs for a second radar sensing based on the second configuration. The apparatus 1204 may include means for performing the second radar sensing based on the received second plurality of RSs. The apparatus 1204 may include means for obtaining the set of configurations by obtaining an RRC configuration including the set of configurations. The apparatus 1204 may include means for obtaining the indicator of the selection of the second configuration by obtaining DCI or a MAC-CE including the indicator of the selection of the second configuration. The means may be the component 198 of the apparatus 1204 configured to perform the functions recited by the means. As described supra, the apparatus 1204 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 13:
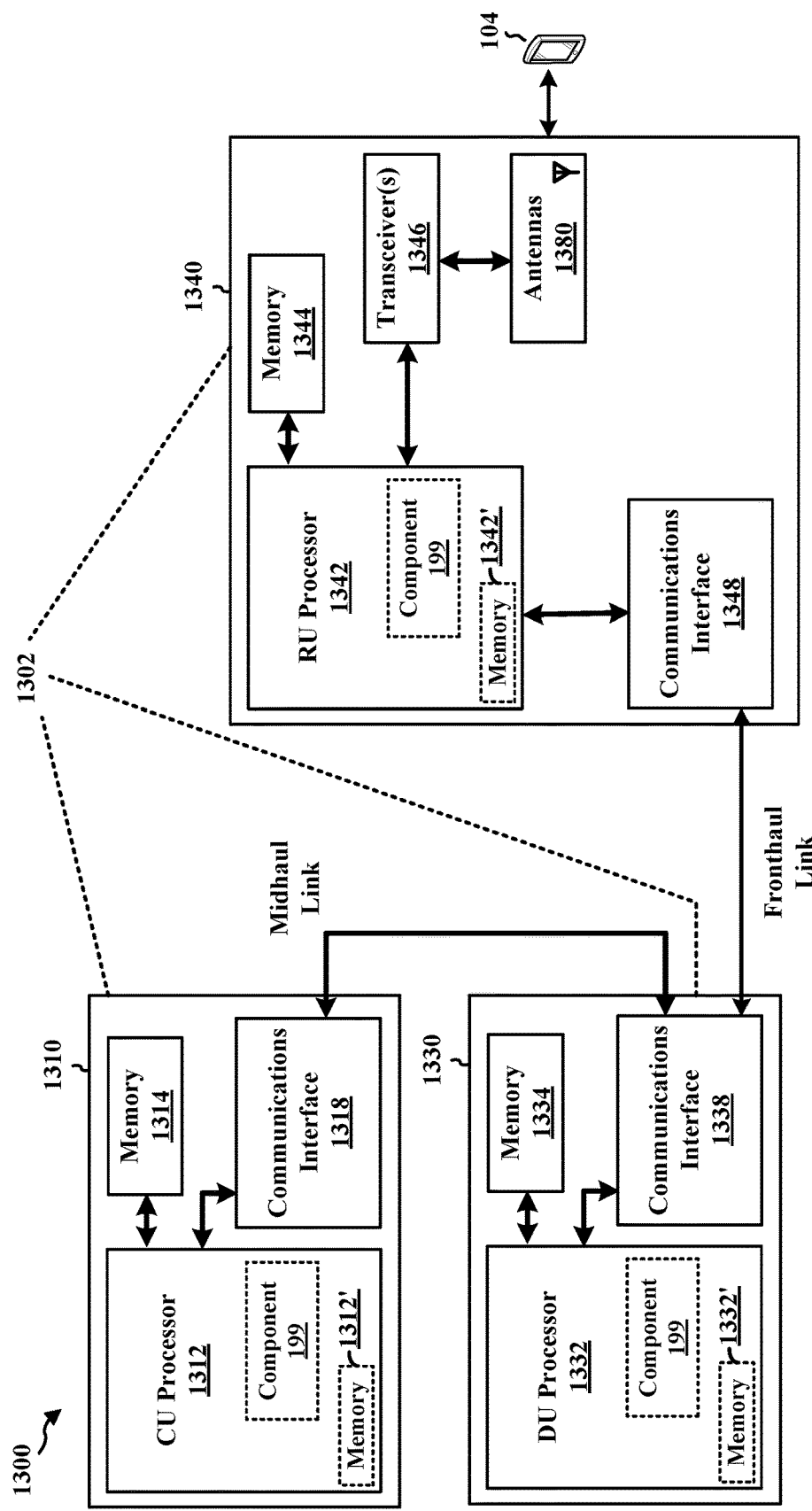
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to output a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. The component 199 may be configured to transmit the plurality of RSs for the radar sensing based on the configuration. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for outputting a configuration of a plurality of RSs based on a set of sensing measurement conditions. The set of sensing management conditions may include one or more of a range resolution, a maximum range, a velocity resolution, a maximum velocity, a velocity range, an AoA measurement, an AoD measurement, or a MIMO sensing occasion for radar sensing. The network entity 1302 may include means for transmitting the plurality of RSs for the radar sensing based on the configuration. The network entity 1302 may include means for transmitting the plurality of RSs by transmitting at least one of the CSI-RSs, at least one of the PRSs, and at least one of the SRSs for the radar sensing. The network entity 1302 may include means for transmitting the plurality of RSs by transmitting at least two of the TRSs or at least two of the PRSs for the radar sensing. The network entity 1302 may include means for transmitting the plurality of RSs by transmitting at least one of the SSBs and at least one of the CSI-RSs for the radar sensing. The network entity 1302 may include means for transmitting the plurality of RSs by transmitting at least one of the PRSs and at least one of the SRSs for the radar sensing. The network entity 1302 may include means for transmitting the plurality of RSs by transmitting at least one of the PRSs, the CSI-RSs, or the SRSs using a plurality of ports for the MIMO sensing occasion. The network entity 1302 may include means for selecting the plurality of RSs based on at least one sensing measurement report for the radar sensing. The network entity 1302 may include means for selecting the plurality of RSs by (a) selecting at least two of the SSBs based on a target detection report of the at least one sensing measurement report, (b) selecting at least two of the PRSs based on a range estimation report of the at least one sensing measurement report, (c) selecting at least two of the TRSs based on a Doppler estimation report of the at least one sensing measurement report, or (d) selecting at least two of the CSI-RSs based on an angular estimation report of the at least one sensing measurement report. The network entity 1302 may include means for selecting the plurality of RSs by selecting at least one of the PRSs and at least one of the CSI-RSs based on a range estimation report of the at least one sensing measurement report. The network entity 1302 may include means for transmitting the plurality of RSs based on the configuration by transmitting the plurality of RSs based on the periodicity, the starting offset, and the duration. The network entity 1302 may include means for transmitting the plurality of RSs for the radar sensing by transmitting the plurality of RSs using TDM, FDM, or SDM. The network entity 1302 may include means for transmitting the plurality of RSs for the radar sensing by transmitting the plurality of RSs consecutively within a time period. The network entity 1302 may include means for transmitting the plurality of RSs for the radar sensing by transmitting the plurality of RSs using a same beam. The network entity 1302 may include means for receiving at least one sensing measurement report based on the plurality of RSs for the radar sensing. The at least one sensing measurement report may include an association between a measurement and a type of RS. The network entity 1302 may include means for receiving a sensing request associated with a second set of sensing measurement conditions based on the plurality of RSs for the radar sensing. The network entity 1302 may include means for outputting a second configuration of a second plurality of RSs based on the second set of sensing measurement conditions for a second radar sensing. The network entity 1302 may include means for transmitting the second plurality of RSs for the second radar sensing based on the second configuration. The network entity 1302 may include means for receiving at least one sensing measurement report based on the plurality of RSs for the radar sensing. The network entity 1302 may include means for outputting a second configuration of a second plurality of RSs based on the at least one sensing measurement report. The network entity 1302 may include means for transmitting the second plurality of RSs for a second radar sensing based on the second configuration. The network entity 1302 may include means for obtaining an indication of a conflict between the radar sensing and a communication occasion. The network entity 1302 may include means for outputting a second configuration of a second plurality of RSs based on the indication of the conflict. The network entity 1302 may include means for transmitting the second plurality of RSs for a second radar sensing based on the second configuration. The network entity 1302 may include means for outputting the configuration of the plurality of RSs may include outputting a set of configurations. Each of the set of configurations may be associated with a distinct plurality of RSs. The network entity 1302 may include means for receiving at least one sensing measurement report based on the plurality of RSs for the radar sensing. The network entity 1302 may include means for include outputting an indicator of a selection of a second configuration from the set of configurations based on the at least one sensing measurement report. The network entity 1302 may include means for transmitting a second plurality of RSs for a second radar sensing based on the second configuration. The network entity 1302 may include means for outputting the set of configurations by outputting an RRC configuration including the set of configurations. The network entity 1302 may include means for outputting the indicator of the selection of the second configuration by outputting DCI or a MAC-CE including the indicator of the selection of the second configuration. The means may be the component 199 of the network entity 1302 configured to perform the functions recited by the means. As described supra, the network entity 1302 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 14:
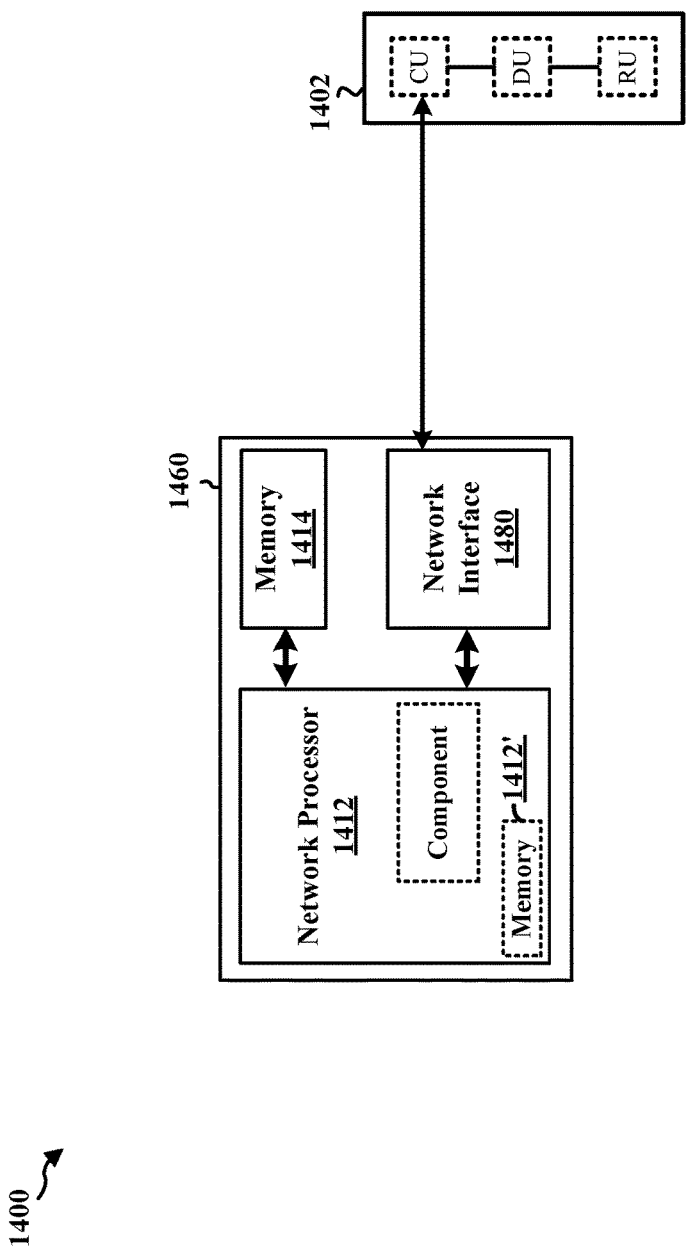
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 140. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to output a configuration of a plurality of RSs based on a set of sensing measurement conditions. The set of sensing measurement conditions may include one or more of a range resolution, a maximum range, a velocity resolution, a maximum velocity, a velocity range, an AoA measurement, an AoD measurement, or a MIMO sensing occasion for radar sensing. The component 199 may be configured to transmit the plurality of RSs for the radar sensing based on the configuration. The component 199 may be within the processor 1412. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for outputting a configuration of a plurality of RSs based on a set of sensing measurement conditions. The set of sensing management conditions may include one or more of a range resolution, a maximum range, a velocity resolution, a maximum velocity, a velocity range, an AoA measurement, an AoD measurement, or a MIMO sensing occasion for radar sensing. The network entity 1460 may include means for transmitting the plurality of RSs for the radar sensing based on the configuration. The network entity 1460 may include means for transmitting the plurality of RSs by transmitting at least one of the CSI-RSs, at least one of the PRSs, and at least one of the SRSs for the radar sensing. The network entity 1460 may include means for transmitting the plurality of RSs by transmitting at least two of the TRSs or at least two of the PRSs for the radar sensing. The network entity 1460 may include means for transmitting the plurality of RSs by transmitting at least one of the SSBs and at least one of the CSI-RSs for the radar sensing. The network entity 1460 may include means for transmitting the plurality of RSs by transmitting at least one of the PRSs and at least one of the SRSs for the radar sensing. The network entity 1460 may include means for transmitting the plurality of RSs by transmitting at least one of the PRSs, the CSI-RSs, or the SRSs using a plurality of ports for the MIMO sensing occasion. The network entity 1460 may include means for selecting the plurality of RSs based on at least one sensing measurement report for the radar sensing. The network entity 1460 may include means for selecting the plurality of RSs by (a) selecting at least two of the SSBs based on a target detection report of the at least one sensing measurement report, (b) selecting at least two of the PRSs based on a range estimation report of the at least one sensing measurement report, (c) selecting at least two of the TRSs based on a Doppler estimation report of the at least one sensing measurement report, or (d) selecting at least two of the CSI-RSs based on an angular estimation report of the at least one sensing measurement report. The network entity 1460 may include means for selecting the plurality of RSs by selecting at least one of the PRSs and at least one of the CSI-RSs based on a range estimation report of the at least one sensing measurement report. The network entity 1460 may include means for transmitting the plurality of RSs based on the configuration by transmitting the plurality of RSs based on the periodicity, the starting offset, and the duration. The network entity 1460 may include means for transmitting the plurality of RSs for the radar sensing by transmitting the plurality of RSs using TDM, FDM, or SDM. The network entity 1460 may include means for transmitting the plurality of RSs for the radar sensing by transmitting the plurality of RSs consecutively within a time period. The network entity 1460 may include means for transmitting the plurality of RSs for the radar sensing by transmitting the plurality of RSs using a same beam. The network entity 1460 may include means for receiving at least one sensing measurement report based on the plurality of RSs for the radar sensing. The at least one sensing measurement report may include an association between a measurement and a type of RS. The network entity 1460 may include means for receiving a sensing request associated with a second set of sensing measurement conditions based on the plurality of RSs for the radar sensing. The network entity 1460 may include means for outputting a second configuration of a second plurality of RSs based on the second set of sensing measurement conditions for a second radar sensing. The network entity 1460 may include means for transmitting the second plurality of RSs for the second radar sensing based on the second configuration. The network entity 1460 may include means for receiving at least one sensing measurement report based on the plurality of RSs for the radar sensing. The network entity 1460 may include means for outputting a second configuration of a second plurality of RSs based on the at least one sensing measurement report. The network entity 1460 may include means for transmitting the second plurality of RSs for a second radar sensing based on the second configuration. The network entity 1460 may include means for obtaining an indication of a conflict between the radar sensing and a communication occasion. The network entity 1460 may include means for outputting a second configuration of a second plurality of RSs based on the indication of the conflict. The network entity 1460 may include means for transmitting the second plurality of RSs for a second radar sensing based on the second configuration. The network entity 1460 may include means for outputting the configuration of the plurality of RSs may include outputting a set of configurations. Each of the set of configurations may be associated with a distinct plurality of RSs. The network entity 1460 may include means for receiving at least one sensing measurement report based on the plurality of RSs for the radar sensing. The network entity 1460 may include means for include outputting an indicator of a selection of a second configuration from the set of configurations based on the at least one sensing measurement report. The network entity 1460 may include means for transmitting a second plurality of RSs for a second radar sensing based on the second configuration. The network entity 1460 may include means for outputting the set of configurations by outputting an RRC configuration including the set of configurations. The network entity 1460 may include means for outputting the indicator of the selection of the second configuration by outputting DCI or a MAC-CE including the indicator of the selection of the second configuration. The means may be the component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, may send the data to a device that transmits the data, or may send the data to a module within the device for processing. A device configured to "obtain" data, such as a transmission, signal, or message, may receive, for example with a transceiver, may obtain the data from a device that receives the data, or may obtain the data from a module within the device that generates the data.

The following aspects are illustrative only and may be combined with other aspects or teachings described herein, without limitation.

Aspect 1 is a method of wireless communication at a wireless node, where the method may include outputting a configuration of a plurality of RSs based on a set of sensing measurement conditions including one or more of a range resolution, a maximum range, a velocity resolution, a maximum velocity, a velocity range, an AoA measurement, an AoD measurement, or a MIMO sensing occasion for radar sensing. The method may include transmitting the plurality of RSs for the radar sensing based on the configuration. The wireless node may be an RS transmission node.

Aspect 2 is the method of aspect 1, where the plurality of RSs may include at least two of PRSs, TRSs, CSI-RSs, SRSs, or SSBs. Each of the SSBs may include a PSS and an SSS.

Aspect 3 is the method of aspect 2, where the set of sensing measurement conditions may include a requisite range resolution. The plurality of RSs may include at least one of the CSI-RSs, at least one of the PRSs, and at least one of the SRSs for the radar sensing based on the requisite range resolution. Transmitting the plurality of RSs may include transmitting at least one of the CSI-RSs, at least one of the PRSs, and at least one of the SRSs for the radar sensing.

Aspect 4 is the method of either of aspects 2 or 3, where the set of sensing measurement conditions may include a requisite velocity resolution. The plurality of RSs may include at least two of the TRSs or at least two of the PRSs for the radar sensing based on the requisite velocity resolution. Transmitting the plurality of RSs may include transmitting at least two of the TRSs or at least two of the PRSs for the radar sensing.

Aspect 5 is the method of aspect 4, where at least two of the TRSs may be associated with a phase coherency duration greater or equal than a phase coherency threshold based on the requisite velocity resolution.

Aspect 6 is the method of either of aspects 4 or 5, where at least two of the PRSs may be associated with a phase coherency based on the requisite velocity resolution.

Aspect 7 is the method of any of aspects 2 to 6, where the set of sensing measurement conditions may include a condition to measure an AoA or an AoD. The plurality of RSs may include at least one of the SSBs and at least one of the CSI-RSs based on the condition to measure the AoA and the AoD. The plurality of RSs may include at least one of the PRSs and at least one of the SRSs based on the condition to measure the AoA and the AoD. Transmitting the plurality of RSs may include transmitting at least one of the SSBs and at least one of the CSI-RSs for the radar sensing. Transmitting the plurality of RSs may include transmitting at least one of the PRSs and at least one of the SRSs for the radar sensing.

Aspect 8 is the method of any of aspects 2 to 7, where the set of sensing measurement conditions may include a MIMO sensing occasion. Transmitting the plurality of RSs may include transmitting at least one of the PRSs, the CSI-RSs, or the SRSs using a plurality of ports for the MIMO sensing occasion.

Aspect 9 is the method of any of aspects 2 to 8, where the method may include selecting the plurality of RSs based on at least one sensing measurement report for the radar sensing.

Aspect 10 is the method of aspect 9, where selecting the plurality of RSs may include (a) selecting at least two of the SSBs based on a target detection report of the at least one sensing measurement report, (b) selecting at least two of the PRSs based on a range estimation report of the at least one sensing measurement report, (c) selecting at least two of the TRSs based on a Doppler estimation report of the at least one sensing measurement report, or (d) selecting at least two of the CSI-RSs based on an angular estimation report of the at least one sensing measurement report.

Aspect 11 is the method of either of aspects 9 or 10, where selecting the plurality of RSs may include selecting at least one of the PRSs and at least one of the CSI-RSs based on a range estimation report of the at least one sensing measurement report.

Aspect 12 is the method of any of aspects 1 to 11, where the configuration may include an indicator of a periodicity, a starting offset, and a duration for the plurality of RSs. Transmitting the plurality of RSs based on the configuration may include transmitting the plurality of RSs based on the periodicity, the starting offset, and the duration.

Aspect 13 is the method of any of aspects 1 to 12, where transmitting the plurality of RSs for the radar sensing may include transmitting the plurality of RSs using TDM, FDM, or SDM.

Aspect 14 is the method of any of aspects 1 to 13, where transmitting the plurality of RSs for the radar sensing may include transmitting the plurality of RSs consecutively within a time period.

Aspect 15 is the method of any of aspects 1 to 14, where transmitting the plurality of RSs for the radar sensing may include transmitting the plurality of RSs using a same beam.

Aspect 16 is the method of any of aspects 1 to 15, where the configuration may include an indicator of an association between the plurality of RSs for the radar sensing.

Aspect 17 is the method of aspect 16, where the indicator may include a QCL indicator.

Aspect 18 is the method of any of aspects 1 to 17, where the method may include receiving at least one sensing measurement report based on the plurality of RSs for the radar sensing. The at least one sensing measurement report may include an association between a measurement and a type of RS.

Aspect 19 is the method of any of aspects 1 to 18, where the method may include receiving a sensing request associated with a second set of sensing measurement conditions based on the plurality of RSs for the radar sensing. The method may include outputting a second configuration of a second plurality of RSs based on the second set of sensing measurement conditions for a second radar sensing. The method may include transmitting the second plurality of RSs for the second radar sensing based on the second configuration.

Aspect 20 is the method of aspect 19, where the plurality of RSs may be associated with a first bandwidth. The second plurality of RSs may be associated with a second bandwidth. The first bandwidth may be narrower than the second bandwidth.

Aspect 21 is the method of either of aspects 19 or 20, where the plurality of RSs may be associated with a first time-domain density. The second plurality of RSs may be associated with a second time-domain density. The first time-domain density may be higher than the second time-domain density.

Aspect 22 is the method of any of aspects 1 to 21, where the method may include receiving at least one sensing measurement report based on the plurality of RSs for the radar sensing. The method may include outputting a second configuration of a second plurality of RSs based on the at least one sensing measurement report. The method may include transmitting the second plurality of RSs for a second radar sensing based on the second configuration.

Aspect 23 is the method of any of aspects 1 to 22, where the method may include obtaining an indication of a conflict between the radar sensing and a communication occasion. The method may include outputting a second configuration of a second plurality of RSs based on the indication of the conflict. The method may include transmitting the second plurality of RSs for a second radar sensing based on the second configuration.

Aspect 24 is the method of any of aspects 1 to 23, where outputting the configuration of the plurality of RSs may include outputting a set of configurations. Each of the set of configurations may be associated with a distinct plurality of RSs. The method may include receiving at least one sensing measurement report based on the plurality of RSs for the radar sensing. The method may include outputting an indicator of a selection of a second configuration from the set of configurations based on the at least one sensing measurement report. The method may include transmitting a second plurality of RSs for a second radar sensing based on the second configuration.

Aspect 25 is the method of aspect 24, where outputting the set of configurations may include transmitting an RRC configuration including the set of configurations.

Aspect 26 is the method of either of aspects 24 or 25, where outputting the indicator of the selection of the second configuration may include outputting DCI or a MAC-CE including the indicator of the selection of the second configuration.

Aspect 27 is a method of wireless communication at a wireless node, where the method may include obtaining a configuration of a plurality of RSs based on a set of sensing measurement conditions including one or more of a range resolution, a maximum range, a velocity resolution, a maximum velocity, a velocity range, an AoA measurement, an AoD measurement, or a MIMO sensing occasion for radar sensing. The method may include receiving the plurality of RSs for the radar sensing based on the configuration. The method may include performing the radar sensing based on the received plurality of RSs. The wireless node may be a sensing node.

Aspect 28 is the method of aspect 27, where the plurality of RSs may include at least two of PRSs. TRSs, CSI-RSs, SRSs, or SSBs. Each of the SSBs may include a PSS and an SSS.

Aspect 29 is the method of aspect 28, where the set of sensing measurement conditions may include a requisite range resolution. The plurality of RSs may include at least one of the CSI-RSs, at least one of the PRSs, and at least one of the SRSs for the radar sensing based on the requisite range resolution. Receiving the plurality of RSs may include receiving at least one of the CSI-RSs, at least one of the PRSs, and at least one of the SRSs for the radar sensing. Performing the radar sensing may include performing the radar sensing on at least one of the CSI-RSs, at least one of the PRSs, and at least one of the SRSs.

Aspect 30 is the method of either of aspects 28 or 29, where the set of sensing measurement conditions may include a requisite velocity resolution. The plurality of RSs may include at least two of the TRSs or at least two of the PRSs for the radar sensing based on the requisite velocity resolution. Receiving the plurality of RSs may include receiving at least two of the TRSs or at least two of the PRSs for the radar sensing. Performing the radar sensing may include performing the radar sensing on at least two of the TRSs or at least two of the PRSs.

Aspect 31 is the method of aspect 30, where at least two of the TRSs may be associated with a phase coherency duration greater or equal than a phase coherency threshold based on the requisite velocity resolution.

Aspect 32 is the method of either of aspects 30 or 31, where at least two of the PRSs may be associated with a phase coherency based on the requisite velocity resolution.

Aspect 33 is the method of any of aspects 28 to 32, where the set of sensing measurement conditions may include a condition to measure an AoA or an AoD. The plurality of RSs may include at least one of the SSBs and at least one of the CSI-RSs based on the condition to measure the AoA and the AoD. The plurality of RSs may include at least one of the PRSs and at least one of the SRSs based on the condition to measure the AoA and the AoD. Receiving the plurality of RSs may include receiving at least one of the SSBs and at least one of the CSI-RSs for the radar sensing. Receiving the plurality of RSs may include receiving at least one of the PRSs and at least one of the SRSs for the radar sensing. Performing the radar sensing may include performing the radar sensing on at least one of the SSBs and at least one of the CSI-RSs or on at least one of the PRSs and at least one of the SRSs.

Aspect 34 is the method of any of aspects 28 to 33, where the set of sensing measurement conditions may include a MIMO sensing occasion. Receiving the plurality of RSs may include receiving at least one of the PRSs, the CSI-RSs, or the SRSs using a plurality of ports for the MIMO sensing occasion. Performing the radar sensing may include performing MIMO radar sensing on at least one of the PRSs, the CSI-RSs, or the SRSs using the plurality of ports for the MIMO sensing occasion.

Aspect 35 is the method of any of aspects 27 to 34, where the configuration may include an indicator of a periodicity, a starting offset, and a duration for the plurality of RSs. Receiving the plurality of RSs based on the configuration may include receiving the plurality of RSs based on the periodicity, the starting offset, and the duration.

Aspect 36 is the method of any of aspects 27 to 35, where the plurality of RSs for the radar sensing may be multiplexed using TDM, FDM, or SDM.

Aspect 37 is the method of any of aspects 27 to 36, where receiving the plurality of RSs for the radar sensing may include receiving the plurality of RSs consecutively within a time period.

Aspect 38 is the method of aspect 37, where performing the radar sensing based on the received plurality of RSs may include associating the received plurality of RSs with each other based on reception of the received plurality of RSs consecutively within the time period. Performing the radar sensing based on the received plurality of RSs may include fusing measurement results of the received plurality of RSs based on the association.

Aspect 39 is the method of any of aspects 27 to 38, where receiving the plurality of RSs for the radar sensing may include receiving the plurality of RSs using a same beam.

Aspect 40 is the method of aspect 39, where performing the radar sensing based on the received plurality of RSs may include associating the received plurality of RSs with each other based on reception of the received plurality of RSs using the same beam. Performing the radar sensing based on the received plurality of RSs may include fusing measurement results of the received plurality of RSs based on the association.

Aspect 41 is the method of any of aspects 27 to 40, where the configuration may include an indicator of an association between the plurality of RSs for the radar sensing.

Aspect 42 is the method of aspect 41, where performing the radar sensing based on the received plurality of RSs may include fusing measurement results of the received plurality of RSs based on the indicator of the association between the plurality of RSs.

Aspect 43 is the method of either of aspects 41 or 42, where the indicator may include a QCL indicator.

Aspect 44 is the method of any of aspects 27 to 43, where the method may include transmitting at least one sensing measurement report based on the radar sensing. The at least one sensing measurement report may include an association between a measurement and a type of RS.

Aspect 45 is the method of any of aspects 27 to 44, where the method may include transmitting a sensing request associated with a second set of sensing measurement conditions based on the radar sensing. The method may include obtaining a second configuration of a second plurality of RSs based on the second set of sensing measurement conditions for a second radar sensing. The method may include receiving the second plurality of RSs for the second radar sensing based on the second configuration. The method may include performing the second radar sensing based on the received second plurality of RSs.

Aspect 46 is the method of aspect 45, where the plurality of RSs may be associated with a first bandwidth. The second plurality of RSs may be associated with a second bandwidth. The first bandwidth may be narrower than the second bandwidth.

Aspect 47 is the method of either of aspects 45 or 46, where the plurality of RSs may be associated with a first time-domain density. The second plurality of RSs may be associated with a second time-domain density. The first time-domain density may be higher than the second time-domain density.

Aspect 48 is the method of any of aspects 27 to 47, where the method may include transmitting at least one sensing measurement report based on the radar sensing. The method may include obtaining a second configuration of a second plurality of RSs based on the at least one sensing measurement report. The method may include receiving the second plurality of RSs for a second radar sensing based on the second configuration. The method may include performing the second radar sensing based on the received second plurality of RSs.

Aspect 49 is the method of any of aspects 27 to 48, where the method may include obtaining a second configuration of a second plurality of RSs based on an indication of a conflict between the radar sensing and a communication occasion. The method may include receiving the second plurality of RSs for a second radar sensing based on the second configuration. The method may include performing the second radar sensing based on the received second plurality of RSs.

Aspect 50 is the method of any of aspects 27 to 49, where obtaining the configuration of the plurality of RSs may include obtaining a set of configurations. Each of the set of configurations may be associated with a distinct plurality of RSs. The method may include transmitting at least one sensing measurement report based on the radar sensing. The method may include obtaining an indicator of a selection of a second configuration from the set of configurations based on the at least one sensing measurement report. The method may include receiving a second plurality of RSs for a second radar sensing based on the second configuration. The method may include performing the second radar sensing based on the received second plurality of RSs.

Aspect 51 is the method of aspect 50, where obtaining the set of configurations may include obtaining an RRC configuration including the set of configurations.

Aspect 52 is the method of either of aspects 50 to 51, where obtaining the indicator of the selection of the second configuration may include obtaining DCI or a MAC-CE including the indicator of the selection of the second configuration.

Aspect 53 is an apparatus for wireless communication, including: a memory; and at least one processor coupled to the memory and, based at least in part on information stored in the memory, the at least one processor is configured to implement any of aspects 1 to 52.

Aspect 54 is the apparatus of aspect 53, further including at least one of an antenna or a transceiver coupled to the at least one processor.

Aspect 55 is an apparatus for wireless communication including means for implementing any of aspects 1 to 52.

Aspect 56 is a computer-readable medium (e.g., a non-transitory computer-readable medium) storing computer executable code, where the code when executed by a processor causes the processor to implement any of aspects 1 to 52.

What is claimed is:

1. An apparatus for wireless communication at a wireless node, comprising:
    memory; and
    at least one processor coupled to the memory and, based at least in part on information stored in the memory, the at least one processor is configured to:
        obtain a configuration of a plurality of reference signals (RSs) based on a set of sensing measurement conditions including one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing;
        receive the plurality of RSs for the radar sensing based on the configuration;
        fuse measurement results of at least two RSs of the received plurality of RSs; and
        perform the radar sensing based on the fused measurement results of the at least two RSs of the received plurality of RSs.

2. The apparatus of claim 1, wherein the at least two RSs of the plurality of RSs comprises at least two different types of RSs, wherein the plurality of RSs comprises at least two of:
    position reference signals (PRSs);
    tracking reference signals (TRSs);
    channel state information (CSI) reference signals (RS) (CSI-RSs);
    sounding reference signals (SRSs); or
    synchronization signal blocks (SSBs), wherein each of the SSBs include a primary synchronization signal (PSS) and a secondary synchronization signal (SSS).

3. The apparatus of claim 2, wherein the set of sensing measurement conditions comprises a MIMO sensing occasion, wherein, to receive the plurality of RSs, the at least one processor is configured to:
    receive at least one of the PRSs, the CSI-RSs, or the SRSs using a plurality of ports for the MIMO sensing occasion, wherein, to perform the radar sensing, the at least one processor is configured to:
        perform MIMO radar sensing on at least one of the PRSs, the CSI-RSs, or the SRSs using the plurality of ports for the MIMO sensing occasion.

4. The apparatus of claim 1, further comprising a transceiver coupled to the at least one processor, wherein, to receive the plurality of RSs for the radar sensing, the at least one processor is configured to:
    receive, via the transceiver, the plurality of RSs consecutively within a time period.

5. The apparatus of claim 4, wherein, to fuse measurement results of the at least two RSs of the received plurality of RSs, the at least one processor is configured to:
    associate the at least two RSs of the received plurality of RSs with each other based on reception of the at least two RSs of the received plurality of RSs consecutively within the time period; and
    fuse measurement results of the at least two RSs of the received plurality of RSs based on the association.

6. The apparatus of claim 1, wherein, to receive the plurality of RSs for the radar sensing, the at least one processor is configured to:
    receive the at least two RSs of the plurality of RSs using a same beam.

7. The apparatus of claim 6, wherein, to fuse measurement results of the at least two RSs of the received plurality of RSs, the at least one processor is configured to:
    associate the at least two RSs of the received plurality of RSs with each other based on reception of the at least two RSs of the received plurality of RSs using the same beam; and
    fuse measurement results of the at least two RSs of the received plurality of RSs based on the association.

8. The apparatus of claim 1, wherein the configuration comprises an indicator of an association between the at least two RSs of the plurality of RSs for the radar sensing.

9. The apparatus of claim 8, wherein, to fuse measurement results of the at least two of the received plurality of RSs, the at least one processor is configured to:
    fuse measurement results of the at least two RSs of the received plurality of RSs based on the indicator of the association between the plurality of RSs.

10. The apparatus of claim 1, wherein the at least one processor is further configured to:
    output a sensing request associated with a second set of sensing measurement conditions based on the radar sensing, wherein at least one sensing measurement condition of the second set of sensing measurement conditions is different than the set of sensing measurement conditions;
    obtain a second configuration of a second plurality of RSs based on the second set of sensing measurement conditions for a second radar sensing, wherein the second plurality of RSs is different than the plurality of RSs;
    receive the second plurality of RSs for the second radar sensing based on the second configuration; and
    perform the second radar sensing based on the received second plurality of RSs.

11. The apparatus of claim 1, wherein the at least one processor is further configured to:
    output at least one sensing measurement report based on the radar sensing;
    obtain a second configuration of a second plurality of RSs based on the at least one sensing measurement report, wherein the second plurality of RSs is different than the plurality of RSs;
    receive the second plurality of RSs for a second radar sensing based on the second configuration; and perform the second radar sensing based on the received second plurality of RSs.

12. The apparatus of claim 1, wherein the at least one processor is further configured to:
obtain a second configuration of a second plurality of RSs based on an indication of a conflict between the radar sensing and a communication occasion;
receive the second plurality of RSs for a second radar sensing based on the second configuration, wherein the second plurality of RSs is different than the plurality of RSs; and
perform the second radar sensing based on the received second plurality of RSs.

13. The apparatus of claim 1, wherein, to obtain the configuration of the plurality of RSs, the at least one processor is configured to:
receive a set of configurations, wherein each of the set of configurations is associated with a distinct plurality of RSs, wherein the at least one processor is further configured to:
output at least one sensing measurement report based on the radar sensing;
obtain an indicator of a selection of a second configuration from the set of configurations after an output of the at least one sensing measurement report;
receive a second plurality of RSs for a second radar sensing based on the second configuration, wherein the second plurality of RSs is different than the plurality of RSs; and
perform the second radar sensing based on the received second plurality of RSs.

14. An apparatus for wireless communication at a wireless node, comprising:
memory; and
at least one processor coupled to the memory and, based at least in part on information stored in the memory, the at least one processor is configured to:
output a configuration of a plurality of reference signals (RSs) based on a set of sensing measurement conditions including one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing;
transmit the plurality of RSs for the radar sensing based on the configuration; and
receive a sensing measurement report based on fused measurement results of at least two RSs of the transmitted plurality of RSs.

15. The apparatus of claim 14, wherein the at least two RSs of the plurality of RSs comprises at least two different types of RSs, wherein the plurality of RSs comprises at least two of:
position reference signals (PRSs);
tracking reference signals (TRSs);
channel state information (CSI) reference signals (RS) (CSI-RSs);
sounding reference signals (SRSs); or
synchronization signal blocks (SSBs), and wherein each of the SSBs include a primary synchronization signal (PSS) and a secondary synchronization signal (SSS).

16. The apparatus of claim 15, wherein the set of sensing measurement conditions comprises a requisite range resolution, wherein the plurality of RSs comprises at least one of the CSI-RSs, at least one of the PRSs, and at least one of the SRSs for the radar sensing based on the requisite range resolution, wherein, to transmit the plurality of RSs, the at least one processor is configured to:
transmit at least one of the CSI-RSs, at least one of the PRSs, and at least one of the SRSs for the radar sensing.

17. The apparatus of claim 15, wherein the set of sensing measurement conditions comprises a requisite velocity resolution, wherein the plurality of RSs comprises at least two of the TRSs or at least two of the PRSs for the radar sensing based on the requisite velocity resolution, wherein, to transmit the plurality of RSs, the at least one processor is configured to:
transmit at least two of the TRSs or at least two of the PRSs for the radar sensing, wherein at least two of the TRSs are associated with a phase coherency duration greater or equal than a phase coherency threshold based on the requisite velocity resolution or wherein at least two of the PRSs are associated with a phase coherency based on the requisite velocity resolution.

18. The apparatus of claim 15, wherein the set of sensing measurement conditions comprises a condition to measure an AoA or an AoD, wherein the plurality of RSs comprises at least one of the SSBs and at least one of the CSI-RSs or comprises at least one of the PRSs and at least one of the SRSs based on the condition to measure the AoA and the AoD, wherein, to transmit the plurality of RSs, the at least one processor is configured to:
transmit at least one of the SSBs and at least one of the CSI-RSs or transmit at least one of the PRSs and at least one of the SRSs for the radar sensing.

19. The apparatus of claim 15, further comprising a transceiver coupled to the at least one processor, wherein the set of sensing measurement conditions comprises a MIMO sensing occasion, wherein, to transmit the plurality of RSs, the at least one processor is configured to:
transmit, via the transceiver, at least one of the PRSs, the CSI-RSs, or the SRSs using a plurality of ports for the MIMO sensing occasion.

20. The apparatus of claim 15, wherein the at least one processor is further configured to:
receive a second sensing measurement report before an output of the configuration; and
select the plurality of RSs based on the received second sensing measurement report.

21. The apparatus of claim 20, wherein, to select the plurality of RSs, the at least one processor is configured to;
select at least two of the SSBs based on a target detection report of the at least one sensing measurement report;
select at least two of the PRSs based on a range estimation report of the at least one sensing measurement report;
select at least two of the TRSs based on a Doppler estimation report of the at least one sensing measurement report; or
select at least two of the CSI-RSs based on an angular estimation report of the at least one sensing measurement report.

22. The apparatus of claim 20, wherein, to select the plurality of RSs, the at least one processor is configured to;
select at least one of the PRSs and at least one of the CSI-RSs based on a range estimation report of the received second sensing measurement report.

23. The apparatus of claim 14, wherein, to transmit the plurality of RSs for the radar sensing, the at least one processor is configured to:
transmit the at least two RSs of the plurality of RSs consecutively within a time period.

24. The apparatus of claim 14, wherein the configuration comprises an indicator of an association between the at least two RSs of the plurality of RSs for the radar sensing.

25. The apparatus of claim 14, wherein the at least one processor is further configured to:
receive a sensing request associated with a second set of sensing measurement conditions based on the plurality of RSs for the radar sensing, wherein at least one sensing measurement condition of the second set of sensing measurement conditions is different than the set of sensing measurement conditions;
output a second configuration of a second plurality of RSs based on the second set of sensing measurement conditions for a second radar sensing, wherein the second plurality of RSs is different than the plurality of RSs; and
transmit the second plurality of RSs for the second radar sensing based on the second configuration.

26. The apparatus of claim 14, wherein the at least one processor is further configured to:
obtain a second sensing measurement report based on the plurality of RSs for the radar sensing;
output a second configuration of a second plurality of RSs based on the obtained second sensing measurement report; and
transmit the second plurality of RSs for a second radar sensing based on the second configuration, wherein the second plurality of RSs is different than the plurality of RSs.

27. The apparatus of claim 14, wherein the at least one processor is further configured to:
obtain an indication of a conflict between the radar sensing and a communication occasion;
output a second configuration of a second plurality of RSs based on the indication of the conflict; and
transmit the second plurality of RSs for a second radar sensing based on the second configuration, wherein the second plurality of RSs is different than the plurality of RSs.

28. The apparatus of claim 14, wherein, to transmit the configuration of the plurality of RSs, the at least one processor is configured to:
transmit a set of configurations, wherein each of the set of configurations is associated with a distinct plurality of RSs, wherein the at least one processor is further configured to:
obtain a second sensing measurement report based on the plurality of RSs for the radar sensing;
output an indicator of a selection of a second configuration from the set of configurations based on the at least one sensing measurement report; and
transmit a second plurality of RSs for a second radar sensing based on the second configuration, wherein the second plurality of RSs is different than the plurality of RSs.

29. A method of wireless communication at a wireless node, comprising:
obtaining a configuration of a plurality of reference signals (RSs) based on a set of sensing measurement conditions including one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing;
receiving the plurality of RSs for the radar sensing based on the configuration;
fusing measurement results of at least two RSs of the received plurality of RSs; and
performing the radar sensing based on the fused measurement results of the at least two RSs of the received plurality of RSs.

30. A method of wireless communication at a wireless node, comprising:
outputting a configuration of a plurality of reference signals (RSs) based on a set of sensing measurement conditions including one or more of a range resolution, a maximum range, a velocity resolution, a maximum velocity, a velocity range, an angle of arrival (AoA) measurement, an angle of departure (AoD) measurement, or a multiple-input multiple-output (MIMO) sensing occasion for radar sensing;
transmitting the plurality of RSs for the radar sensing based on the configuration; and
receiving a sensing measurement report based on fused measurement results of at least two RSs of the transmitted plurality of RSs.

* * * * *